United States Patent
Angus et al.

(10) Patent No.: US 11,260,881 B1
(45) Date of Patent: Mar. 1, 2022

(54) LIDAR SYSTEM

(71) Applicant: Blackmore Sensors & Analytics, LLC, Palo Alto, CA (US)

(72) Inventors: Edward Joseph Angus, Bozeman, MT (US); Zeb Barber, Bozeman, MT (US); Ryan Moore Galloway, Bozeman, MT (US)

(73) Assignee: BLACKMORE SENSORS & ANALYTICS, LLC, Palo Alto, CA (US)

( * ) Notice: Subject to any disclaimer, the term of this patent is extended or adjusted under 35 U.S.C. 154(b) by 0 days.

(21) Appl. No.: 17/182,455

(22) Filed: Feb. 23, 2021

(51) Int. Cl.
| | |
|---|---|
| *G01C 3/08* | (2006.01) |
| *B60W 60/00* | (2020.01) |
| *G01S 7/481* | (2006.01) |
| *G01S 17/931* | (2020.01) |
| *G01B 21/22* | (2006.01) |
| *G01S 17/58* | (2006.01) |
| *B60W 30/095* | (2012.01) |
| *B60W 10/20* | (2006.01) |
| *B60W 10/18* | (2012.01) |
| *B60W 30/09* | (2012.01) |
| *G01S 17/06* | (2006.01) |

(52) U.S. Cl.
CPC .......... *B60W 60/001* (2020.02); *B60W 10/18* (2013.01); *B60W 10/20* (2013.01); *B60W 30/09* (2013.01); *B60W 30/0956* (2013.01); *G01B 21/22* (2013.01); *G01S 7/481* (2013.01); *G01S 7/4814* (2013.01); *G01S 7/4817* (2013.01); *G01S 17/06* (2013.01); *G01S 17/58* (2013.01); *G01S 17/931* (2020.01); *B60W 2420/52* (2013.01); *B60W 2554/404* (2020.02); *B60W 2554/80* (2020.02)

(58) Field of Classification Search
CPC ......... B60W 60/001; B60W 2554/404; B60W 2554/80; B60W 2420/52; B60W 30/0956; B60W 10/18; B60W 10/20; B60W 30/09; G01S 7/481; G01S 17/58; G01S 17/06; G01S 7/4817; G01S 7/4814; G01S 17/931; G01B 21/22
See application file for complete search history.

(56) References Cited

U.S. PATENT DOCUMENTS

| | | | |
|---|---|---|---|
| 2010/0299082 A1* | 11/2010 | Toyosawa | G06F 30/20 702/33 |
| 2019/0302239 A1* | 10/2019 | Baier | G01S 7/4817 |
| 2020/0217966 A1* | 7/2020 | Angus | G01S 17/26 |
| 2020/0379088 A1* | 12/2020 | Donovan | G01S 17/931 |

* cited by examiner

*Primary Examiner* — Samantha K Nickerson
(74) *Attorney, Agent, or Firm* — Foley & Lardner LLP

(57) ABSTRACT

A LIDAR system includes a laser source, a first lens, and a second lens. The laser source is configured to output a first beam. The first lens includes a planar portion and a convex portion. The first lens is configured to receive the first beam and output a second beam responsive to the first beam. The second lens includes a concave portion and a planar portion. The second lens is configured to receive the second beam and output a third beam responsive to the second beam.

12 Claims, 16 Drawing Sheets

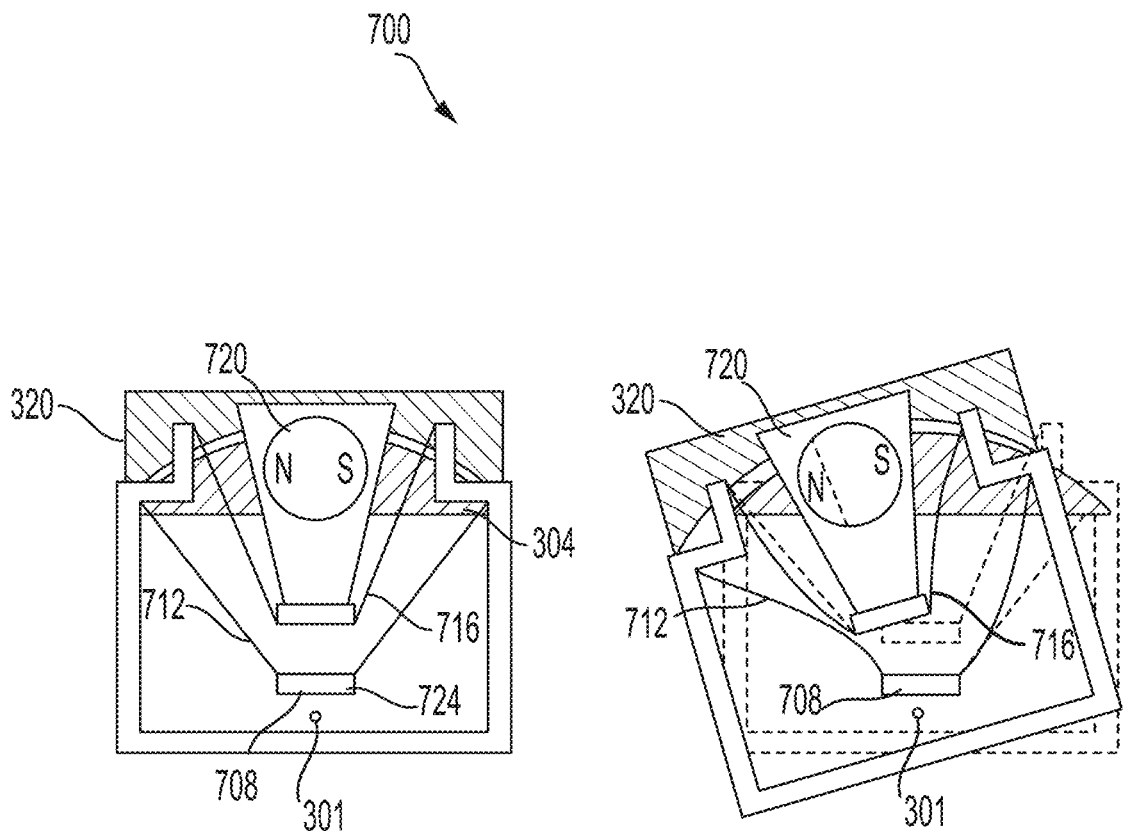
FIG. 7A
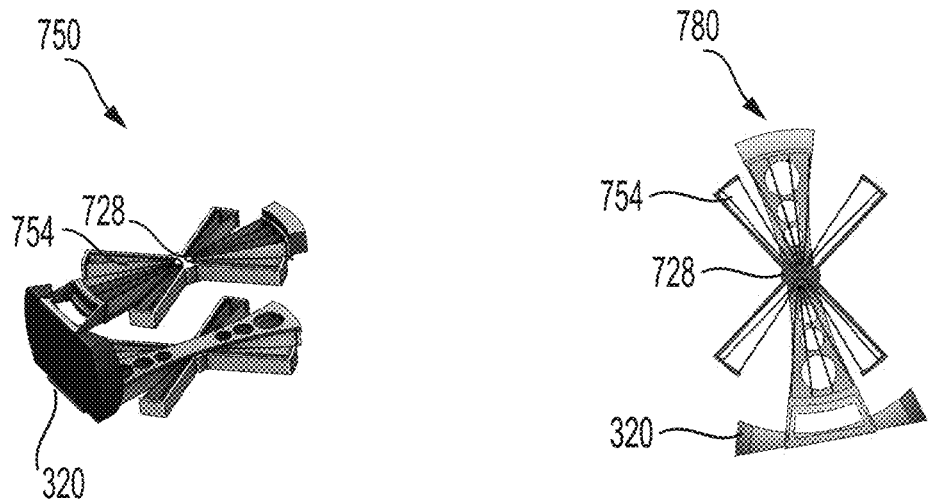
FIG. 7B
FIG. 7C

LIDAR SYSTEM

BACKGROUND

Optical detection of range using lasers, often referenced by a mnemonic, LIDAR, for light detection and ranging, also sometimes called laser RADAR, is used for a variety of applications, including imaging and collision avoidance. LIDAR provides finer scale range resolution with smaller beam sizes than conventional microwave ranging systems, such as radio-wave detection and ranging (RADAR).

SUMMARY

At least one aspect relates to a light detection and ranging (LIDAR) system. The LIDAR system includes a laser source, a first lens, and a second lens. The laser source is configured to output a first beam. The first lens includes a planar portion and a convex portion. The first lens is configured to receive the first beam and output a second beam responsive to the first beam. The second lens includes a concave portion and a planar portion. The second lens is configured to receive the second beam and output a third beam responsive to the second beam.

At least one aspect relates to an autonomous vehicle control system. The autonomous vehicle control system includes a laser source, a first lens, a second lens, and one or more processors. The laser source is configured to output a first beam. The first lens includes a planar portion and a convex portion. The first lens is configured to receive the first beam and output a second beam responsive to the first beam. The second lens includes a concave portion and a planar portion. The second lens is configured to receive the second beam and output a third beam responsive to the second beam. The one or more processors are configured to determine at least one of a range to an object or a velocity of the object using a return beam received responsive to the third beam and control operation of an autonomous vehicle responsive to the at least one of the range or the velocity.

At least one aspect relates to an autonomous vehicle. The autonomous vehicle includes a LIDAR system, at least one of a steering system or a braking system, and a vehicle controller. The LIDAR system includes a laser source, a first lens, and a second lens. The laser source is configured to output a first beam. The first lens includes a planar portion and a convex portion. The first lens is configured to receive the first beam and output a second beam responsive to the first beam. The second lens includes a concave portion and a planar portion. The second lens is configured to receive the second beam and output a third beam responsive to the second beam. The vehicle controller includes one or more processors configured to determine at least one of a range to an object or a velocity of the object using a return beam received responsive to the third beam and control operation of the at least one of the steering system and the braking system responsive to the at least one of the range or the velocity.

Those skilled in the art will appreciate that the summary is illustrative only and is not intended to be in any way limiting. Any of the features described herein may be used with any other features, and any subset of such features can be used in combination according to various embodiments. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

Implementations are illustrated by way of example, and not by way of limitation, in the figures of the accompanying drawings in which like reference numerals refer to similar elements and in which:

FIG. 7A is a schematic diagram of an example of a LIDAR system that includes a flexure;

FIG. 7B is a perspective view of an example of a flexure assembly of a LIDAR system;

FIG. 7C is a finite element analysis diagram of an example of the flexure assembly of FIG. 7B;

DETAILED DESCRIPTION

A LIDAR system can generate and transmit a light beam that an object can reflect or otherwise scatter as a return beam corresponding to the transmitted beam. The LIDAR system can receive the return beam, and process the return beam or characteristics thereof to determine parameters regarding the object such as range and velocity. The LIDAR system can apply various frequency or phase modulations to the transmitted beam, which can facilitate relating the return beam to the transmitted beam in order to determine the parameters regarding the object.

The LIDAR system can include a laser source, a first lens, and a second lens. The laser source can be configured to output a first beam. The first lens can include a first, planar portion and a second, convex portion. The first lens can be configured to receive the first beam and output a second beam responsive to the first beam. The second lens can include a third, concave portion and a fourth, planar portion. The second lens can be configured to receive the second beam and output a third beam responsive to the second beam.

Systems and methods in accordance with the present disclosure can use the LIDAR system to output a highly linear transmitted beam, such as a transmitted beam that is within a threshold of having a triangular waveform over time. This can enable more consistent sampling of angles scanned by the transmitted beam, and can improve performance characteristics of the LIDAR system, such as signal to noise ratio, for determining parameters of objects in the environment around the LIDAR system using the transmitted beam and return beams that are scattered by the objects in the environment. For example, improved performance characteristics can enable the LIDAR system to more accurately determine range, velocity, and Doppler shift information regarding objects, which can enable a maximum design range of the LIDAR system to increase. For example, the LIDAR system can be effectively used for long range applications (e.g., maximum range greater than 400 meters), such as autonomous trucking.

1. System Environments for Autonomous Vehicles

Figure 1A:
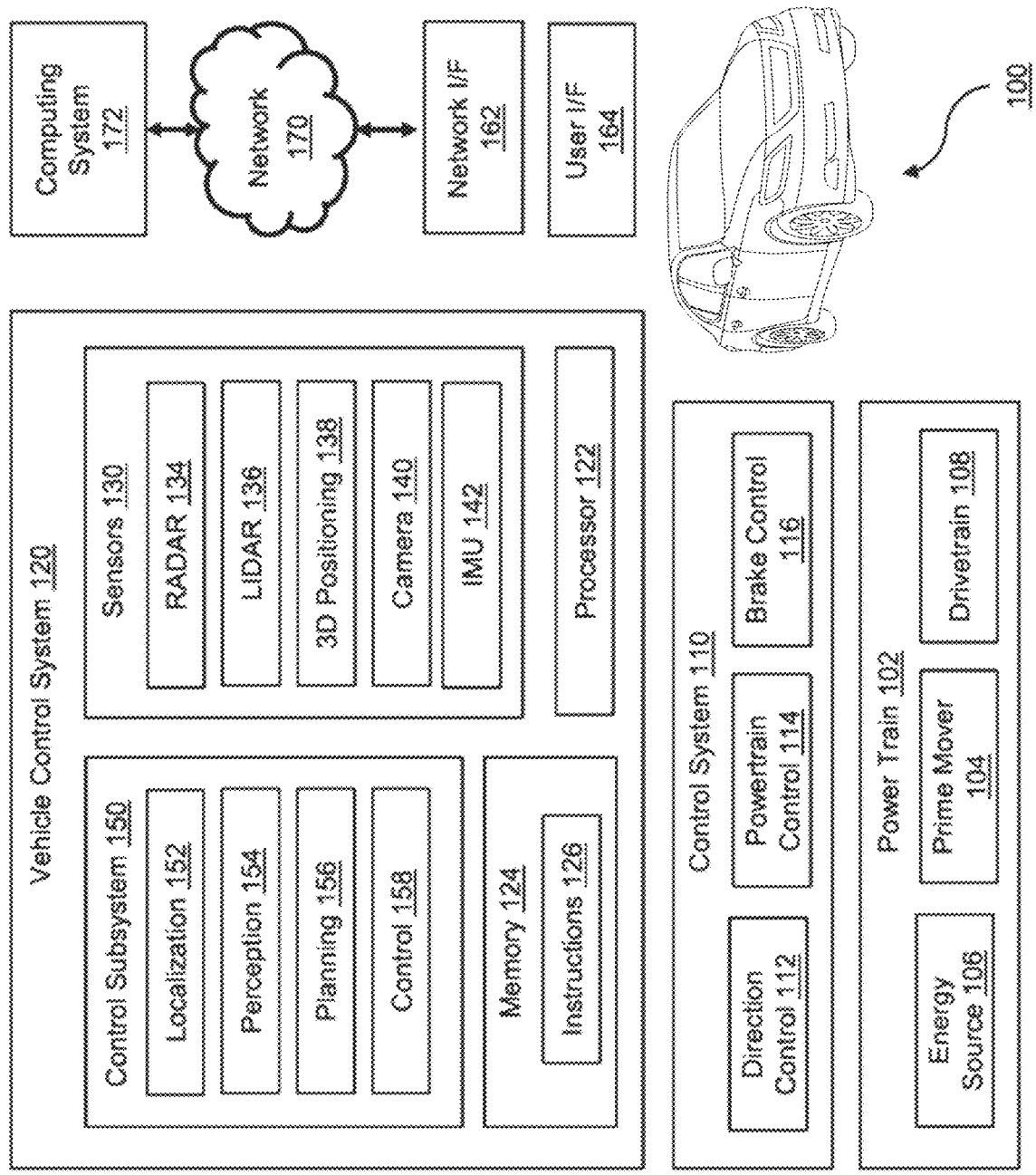
FIG. 1A is a block diagram of an example of a system environment for autonomous vehicles.

FIG. 1A is a block diagram illustrating an example of a system environment for autonomous vehicles according to some implementations. FIG. 1A depicts an example autonomous vehicle 100 within which the various techniques disclosed herein may be implemented. The vehicle 100, for example, may include a powertrain 102 including a prime mover 104 powered by an energy source 106 and capable of providing power to a drivetrain 108, as well as a control system 110 including a direction control 112, a powertrain control 114, and a brake control 116. The vehicle 100 may be implemented as any number of different types of vehicles, including vehicles capable of transporting people and/or cargo, and capable of traveling in various environments. The aforementioned components 102-116 can vary widely based upon the type of vehicle within which these components are utilized, such as a wheeled land vehicle such as a car, van, truck, or bus. The prime mover 104 may include one or more electric motors and/or an internal combustion engine (among others). The energy source may include, for example, a fuel system (e.g., providing gasoline, diesel, hydrogen, etc.), a battery system, solar panels or other renewable energy source, and/or a fuel cell system. The drivetrain 108 can include wheels and/or tires along with a transmission and/or any other mechanical drive components to convert the output of the prime mover 104 into vehicular motion, as well as one or more brakes configured to controllably stop or slow the vehicle 100 and direction or steering components suitable for controlling the trajectory of the vehicle 100 (e.g., a rack and pinion steering linkage enabling one or more wheels of the vehicle 100 to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles), and in some instances multiple electric motors (e.g., dedicated to individual wheels or axles) may be used as a prime mover.

The direction control 112 may include one or more actuators and/or sensors for controlling and receiving feedback from the direction or steering components to enable the vehicle 100 to follow a desired trajectory. The powertrain control 114 may be configured to control the output of the powertrain 102, e.g., to control the output power of the prime mover 104, to control a gear of a transmission in the drivetrain 108, etc., thereby controlling a speed and/or direction of the vehicle 100. The brake control 116 may be configured to control one or more brakes that slow or stop vehicle 100, e.g., disk or drum brakes coupled to the wheels of the vehicle.

Other vehicle types, including but not limited to off-road vehicles, all-terrain or tracked vehicles, construction equipment, may utilize different powertrains, drivetrains, energy sources, direction controls, powertrain controls and brake controls. Moreover, in some implementations, some of the components can be combined, e.g., where directional control of a vehicle is primarily handled by varying an output of one or more prime movers.

Various levels of autonomous control over the vehicle 100 can be implemented in a vehicle control system 120, which may include one or more processors 122 and one or more memories 124, with each processor 122 configured to execute program code instructions 126 stored in a memory 124. The processors(s) can include, for example, graphics processing unit(s) ("GPU(s)")) and/or central processing unit(s) ("CPU(s)").

Sensors 130 may include various sensors suitable for collecting information from a vehicle's surrounding environment for use in controlling the operation of the vehicle. For example, sensors 130 can include radar sensor 134, LIDAR (Light Detection and Ranging) sensor 136, a 3D positioning sensors 138, e.g., any of an accelerometer, a gyroscope, a magnetometer, or a satellite navigation system such as GPS (Global Positioning System), GLONASS (Globalnaya Navigazionnaya Sputnikovaya Sistema, or Global Navigation Satellite System), BeiDou Navigation Satellite System (BDS), Galileo, Compass, etc. The 3D positioning sensors 138 can be used to determine the location of the vehicle on the Earth using satellite signals. The sensors 130 can include a camera 140 and/or an IMU (inertial measurement unit) 142. The camera 140 can be a monographic or stereographic camera and can record still and/or video images. The IMU 142 can include multiple gyroscopes and accelerometers capable of detecting linear and rotational motion of the vehicle in three directions. One or more encoders (not illustrated), such as wheel encoders may be used to monitor the rotation of one or more wheels of vehicle 100. Each sensor 130 can output sensor data at various data rates, which may be different than the data rates of other sensors 130.

The outputs of sensors 130 may be provided to a set of control subsystems 150, including a localization subsystem 152, a planning subsystem 156, a perception subsystem 154, and a control subsystem 158. The localization subsystem 152 can perform functions such as precisely determining the location and orientation (also sometimes referred to as "pose") of the vehicle 100 within its surrounding environment, and generally within some frame of reference. The location of an autonomous vehicle can be compared with the location of an additional vehicle in the same environment as part of generating labeled autonomous vehicle data. The perception subsystem 154 can perform functions such as detecting, tracking, determining, and/or identifying objects within the environment surrounding vehicle 100. A machine learning model in accordance with some implementations can be utilized in tracking objects. The planning subsystem 156 can perform functions such as planning a trajectory for vehicle 100 over some timeframe given a desired destination as well as the static and moving objects within the environment. A machine learning model in accordance with some implementations can be utilized in planning a vehicle trajectory. The control subsystem 158 can perform functions such as generating suitable control signals for controlling the various controls in the vehicle control system 120 in order to implement the planned trajectory of the vehicle 100. A machine learning model can be utilized to generate one or more signals to control an autonomous vehicle to implement the planned trajectory.

Multiple sensors of types illustrated in FIG. 1A can be used for redundancy and/or to cover different regions around a vehicle, and other types of sensors may be used. Various types and/or combinations of control subsystems may be used. Some or all of the functionality of a subsystem 152-158 may be implemented with program code instructions 126 resident in one or more memories 124 and executed by one or more processors 122, and these subsystems 152-158 may in some instances be implemented using the same processor(s) and/or memory. Subsystems may be implemented at least in part using various dedicated circuit logic, various processors, various field programmable gate arrays ("FPGA"), various application-specific integrated circuits ("ASIC"), various real time controllers, and the like, as noted above, multiple subsystems may utilize circuitry, processors, sensors, and/or other components. Further, the various components in the vehicle control system 120 may be networked in various manners.

In some implementations, the vehicle 100 may also include a secondary vehicle control system (not illustrated), which may be used as a redundant or backup control system for the vehicle 100. In some implementations, the secondary vehicle control system may be capable of fully operating the autonomous vehicle 100 in the event of an adverse event in the vehicle control system 120, while in other implementations, the secondary vehicle control system may only have limited functionality, e.g., to perform a controlled stop of the vehicle 100 in response to an adverse event detected in the primary vehicle control system 120. In still other implementations, the secondary vehicle control system may be omitted.

Various architectures, including various combinations of software, hardware, circuit logic, sensors, and networks, may be used to implement the various components illustrated in FIG. 1A. Each processor may be implemented, for example, as a microprocessor and each memory may represent the random access memory ("RAM") devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in the vehicle 100, e.g., any cache memory in a processor, as well as any storage capacity used as a virtual memory, e.g., as stored on a mass storage device or another computer controller. One or more processors illustrated in FIG. 1A, or entirely separate processors, may be used to implement additional functionality in the vehicle 100 outside of the purposes of autonomous control, e.g., to control entertainment systems, to operate doors, lights, convenience features, etc.

In addition, for additional storage, the vehicle 100 may include one or more mass storage devices, e.g., a removable disk drive, a hard disk drive, a direct access storage device ("DASD"), an optical drive (e.g., a CD drive, a DVD drive, etc.), a solid state storage drive ("SSD"), network attached storage, a storage area network, and/or a tape drive, among others.

Furthermore, the vehicle 100 may include a user interface 164 to enable vehicle 100 to receive a number of inputs from and generate outputs for a user or operator, e.g., one or more displays, touchscreens, voice and/or gesture interfaces, buttons and other tactile controls, etc. Otherwise, user input may be received via another computer or electronic device, e.g., via an app on a mobile device or via a web interface.

Moreover, the vehicle 100 may include one or more network interfaces, e.g., network interface 162, suitable for communicating with one or more networks 170 (e.g., a Local Area Network ("LAN"), a wide area network ("WAN"), a wireless network, and/or the Internet, among others) to permit the communication of information with other computers and electronic device, including, for example, a central service, such as a cloud service, from which the vehicle 100 receives environmental and other data for use in autonomous control thereof. Data collected by the one or more sensors 130 can be uploaded to a computing system 172 via the network 170 for additional processing. In some implementations, a time stamp can be added to each instance of vehicle data prior to uploading.

Each processor illustrated in FIG. 1A, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer coupled to vehicle 100 via network 170, e.g., in a distributed, cloud-based, or client-server computing environment, whereby the processing required to implement the functions of a computer program may be allocated to multiple computers and/or services over a network.

In general, the routines executed to implement the various implementations described herein, whether implemented as part of an operating system or a specific application, component, program, object, module or sequence of instructions, or even a subset thereof, will be referred to herein as "program code". Program code can include one or more instructions that are resident at various times in various memory and storage devices, and that, when read and executed by one or more processors, perform the steps necessary to execute steps or elements embodying the various aspects of the present disclosure. Moreover, while implementations have and hereinafter will be described in the context of fully functioning computers and systems, it will be appreciated that the various implementations described herein are capable of being distributed as a program product in a variety of forms, and that implementations can be implemented regardless of the particular type of computer readable media used to actually carry out the distribution.

Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.) among others.

In addition, various program code described hereinafter may be identified based upon the application within which it is implemented in a specific implementation. Any particular program nomenclature that follows is used merely for convenience, and thus the present disclosure should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), the present disclosure is not limited to the specific organization and allocation of program functionality described herein.

2. LIDAR for Automotive Applications

Figure 2:
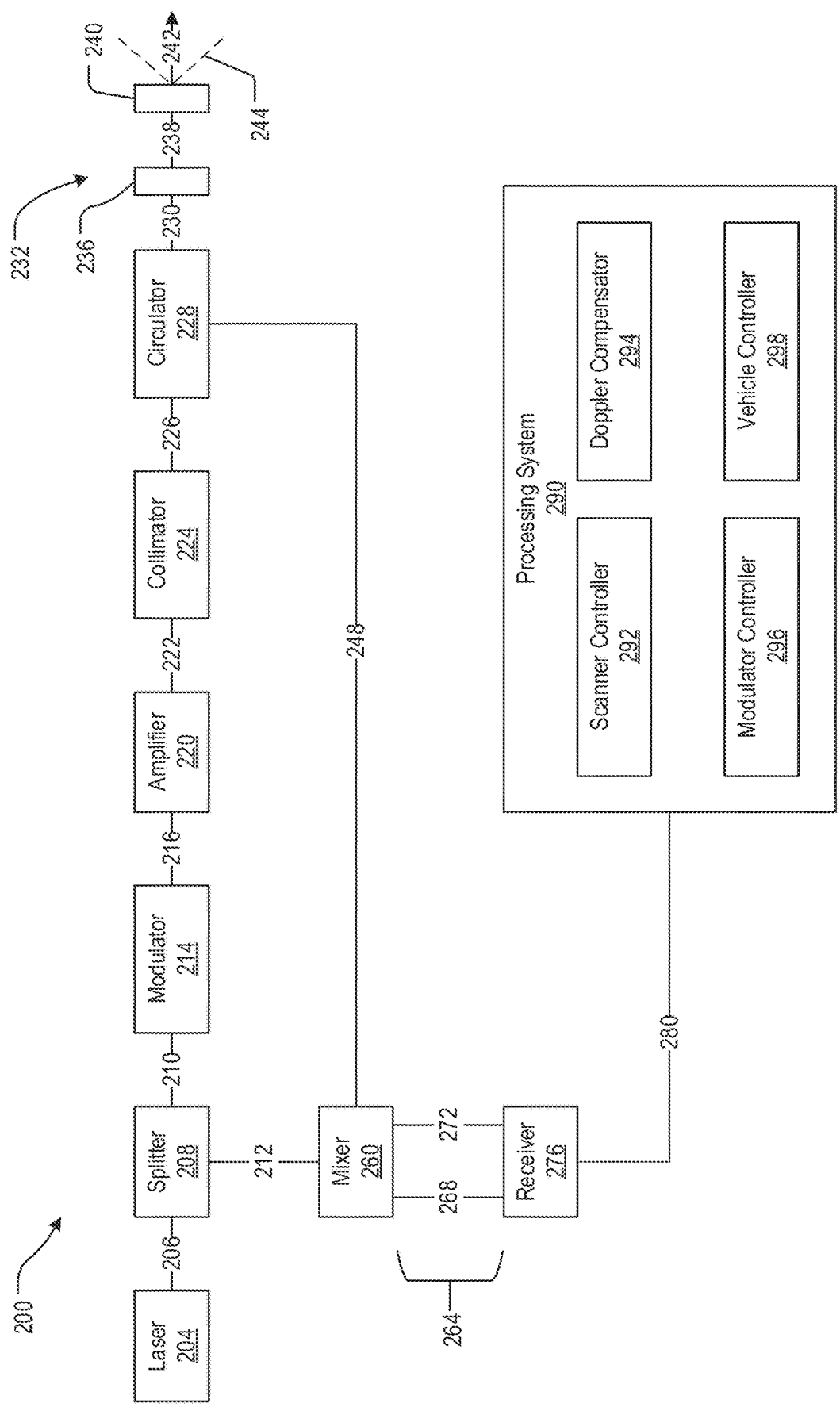
FIG. 2 is a block diagram of an example of a LIDAR system.

A truck can include a LIDAR system (e.g., vehicle control system 120 in FIG. 1A, LIDAR system 200 in FIG. 2, among others described herein). In some implementations, the LIDAR system can use frequency modulation to encode an optical signal and scatter the encoded optical signal into free-space using optics. By detecting the frequency differences between the encoded optical signal and a returned signal reflected back from an object, the frequency modulated (FM) LIDAR system can determine the location of the object and/or precisely measure the velocity of the object using the Doppler effect. In some implementations, an FM LIDAR system may use a continuous wave (referred to as, "FMCW LIDAR") or a quasi-continuous wave (referred to as, "FMQW LIDAR"). In some implementations, the LIDAR system can use phase modulation (PM) to encode an optical signal and scatters the encoded optical signal into free-space using optics.

In some instances, an object (e.g., a pedestrian wearing dark clothing) may have a low reflectivity, in that it only reflects back to the sensors (e.g., sensors 130 in FIG. 1A) of the FM or PM LIDAR system a low amount (e.g., 10% or less) of the light that hit the object. In other instances, an object (e.g., a shiny road sign) may have a high reflectivity (e.g., above 10%), in that it reflects back to the sensors of the FM LIDAR system a high amount of the light that hit the object.

Regardless of the object's reflectivity, an FM LIDAR system may be able to detect (e.g., classify, recognize, discover, etc.) the object at greater distances (e.g., 2×) than a conventional LIDAR system. For example, an FM LIDAR system may detect a low reflectively object beyond 300 meters, and a high reflectivity object beyond 400 meters.

To achieve such improvements in detection capability, the FM LIDAR system may use sensors (e.g., sensors 130 in FIG. 1A). In some implementations, these sensors can be single photon sensitive, meaning that they can detect the smallest amount of light possible. While an FM LIDAR system may, in some applications, use infrared wavelengths (e.g., 950 nm, 1550 nm, etc.), it is not limited to the infrared wavelength range (e.g., near infrared: 800 nm-1500 nm; middle infrared: 1500 nm-5600 nm; and far infrared: 5600 nm-1,000,000 nm). By operating the FM or PM LIDAR system in infrared wavelengths, the FM or PM LIDAR system can broadcast stronger light pulses or light beams than conventional LIDAR systems.

Thus, by detecting an object at greater distances, an FM LIDAR system may have more time to react to unexpected obstacles. Indeed, even a few milliseconds of extra time could improve response time and comfort, especially with heavy vehicles (e.g., commercial trucking vehicles) that are driving at highway speeds.

The FM LIDAR system can provide accurate velocity for each data point instantaneously. In some implementations, a velocity measurement is accomplished using the Doppler effect which shifts frequency of the light received from the object based at least one of the velocity in the radial direction (e.g., the direction vector between the object detected and the sensor) or the frequency of the laser signal. For example, for velocities encountered in on-road situations where the velocity is less than 100 meters per second (m/s), this shift at a wavelength of 1550 nanometers (nm) amounts to the frequency shift that is less than 130 megahertz (MHz). This frequency shift is small such that it is difficult to detect directly in the optical domain. However, by using coherent detection in FMCW, PMCW, or FMQW LIDAR systems, the signal can be converted to the RF domain such that the frequency shift can be calculated using various signal processing techniques. This enables the autonomous vehicle control system to process incoming data faster.

Instantaneous velocity calculation also makes it easier for the FM LIDAR system to determine distant or sparse data points as objects and/or track how those objects are moving over time. For example, an FM LIDAR sensor (e.g., sensors 130 in FIG. 1A) may only receive a few returns (e.g., hits) on an object that is 300 m away, but if those return give a velocity value of interest (e.g., moving towards the vehicle at >70 mph), then the FM LIDAR system and/or the autonomous vehicle control system may determine respective weights to probabilities associated with the objects.

Faster identification and/or tracking of the FM LIDAR system gives an autonomous vehicle control system more time to maneuver a vehicle. A better understanding of how fast objects are moving also allows the autonomous vehicle control system to plan a better reaction.

The FM LIDAR system can have less static compared to conventional LIDAR systems. That is, the conventional LIDAR systems that are designed to be more light-sensitive typically perform poorly in bright sunlight. These systems also tend to suffer from crosstalk (e.g., when sensors get confused by each other's light pulses or light beams) and from self-interference (e.g., when a sensor gets confused by its own previous light pulse or light beam). To overcome these disadvantages, vehicles using the conventional LIDAR systems often need extra hardware, complex software, and/or more computational power to manage this "noise."

In contrast, FM LIDAR systems do not suffer from these types of issues because each sensor is specially designed to respond only to its own light characteristics (e.g., light beams, light waves, light pulses). If the returning light does not match the timing, frequency, and/or wavelength of what was originally transmitted, then the FM sensor can filter (e.g., remove, ignore, etc.) out that data point. As such, FM LIDAR systems produce (e.g., generates, derives, etc.) more accurate data with less hardware or software requirements, enabling smoother driving.

The FM LIDAR system can be easier to scale than conventional LIDAR systems. As more self-driving vehicles (e.g., cars, commercial trucks, etc.) show up on the road, those powered by an FM LIDAR system likely will not have to contend with interference issues from sensor crosstalk. Furthermore, an FM LIDAR system uses less optical peak power than conventional LIDAR sensors. As such, some or all of the optical components for an FM LIDAR can be produced on a single chip, which produces its own benefits, as discussed herein.

2.1 Commercial Trucking

Figure 1B:
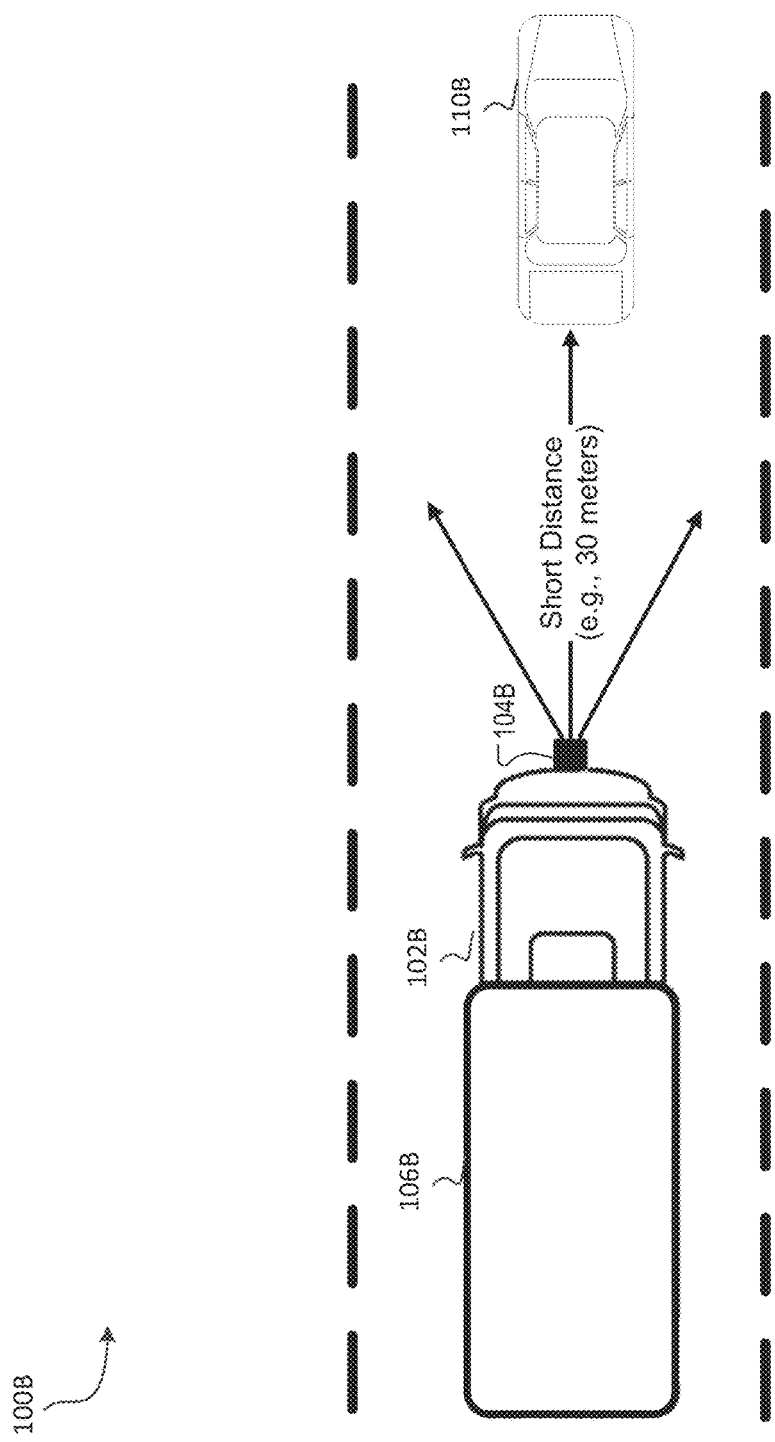
FIG. 1B is a block diagram of an example of a system environment for autonomous commercial trucking vehicles.

FIG. 1B is a block diagram illustrating an example of a system environment for autonomous commercial trucking vehicles, according to some implementations. The environment 100B includes a commercial truck 102B for hauling cargo 106B. In some implementations, the commercial truck 102B may include vehicles configured to long-haul freight transport, regional freight transport, intermodal freight transport (i.e., in which a road-based vehicle is used as one of multiple modes of transportation to move freight), and/or any other road-based freight transport applications. In some implementations, the commercial truck 102B may be a flatbed truck, a refrigerated truck (e.g., a reefer truck), a vented van (e.g., dry van), a moving truck, etc. In some implementations, the cargo 106B may be goods and/or produce. In some implementations, the commercial truck 102B may include a trailer to carry the cargo 106B, such as a flatbed trailer, a lowboy trailer, a step deck trailer, an extendable flatbed trailer, a sidekit trailer, etc.

The environment 100B includes an object 110B (shown in FIG. 1B as another vehicle) that is within a distance range that is equal to or less than 30 meters from the truck.

The commercial truck 102B may include a LIDAR system 104B (e.g., an FM LIDAR system, vehicle control system 120 in FIG. 1A, LIDAR system 200 in FIG. 2A) for determining a distance to the object 110B and/or measuring the velocity of the object 110B. Although FIG. 1B shows that one LIDAR system 104B is mounted on the front of the commercial truck 102B, the number of LIDAR system and the mounting area of the LIAR system on the commercial truck are not limited to a particular number or a particular area. The commercial truck 102B may include any number of LIDAR systems 104B (or components thereof, such as sensors, modulators, coherent signal generators, etc.) that are mounted onto any area (e.g., front, back, side, top, bottom, underneath, and/or bottom) of the commercial truck 102B to facilitate the detection of an object in any free-space relative to the commercial truck 102B.

As shown, the LIDAR system 104B in environment 100B may be configured to detect an object (e.g., another vehicle, a bicycle, a tree, street signs, potholes, etc.) at short distances (e.g., 30 meters or less) from the commercial truck 102B.

Figure 1C:
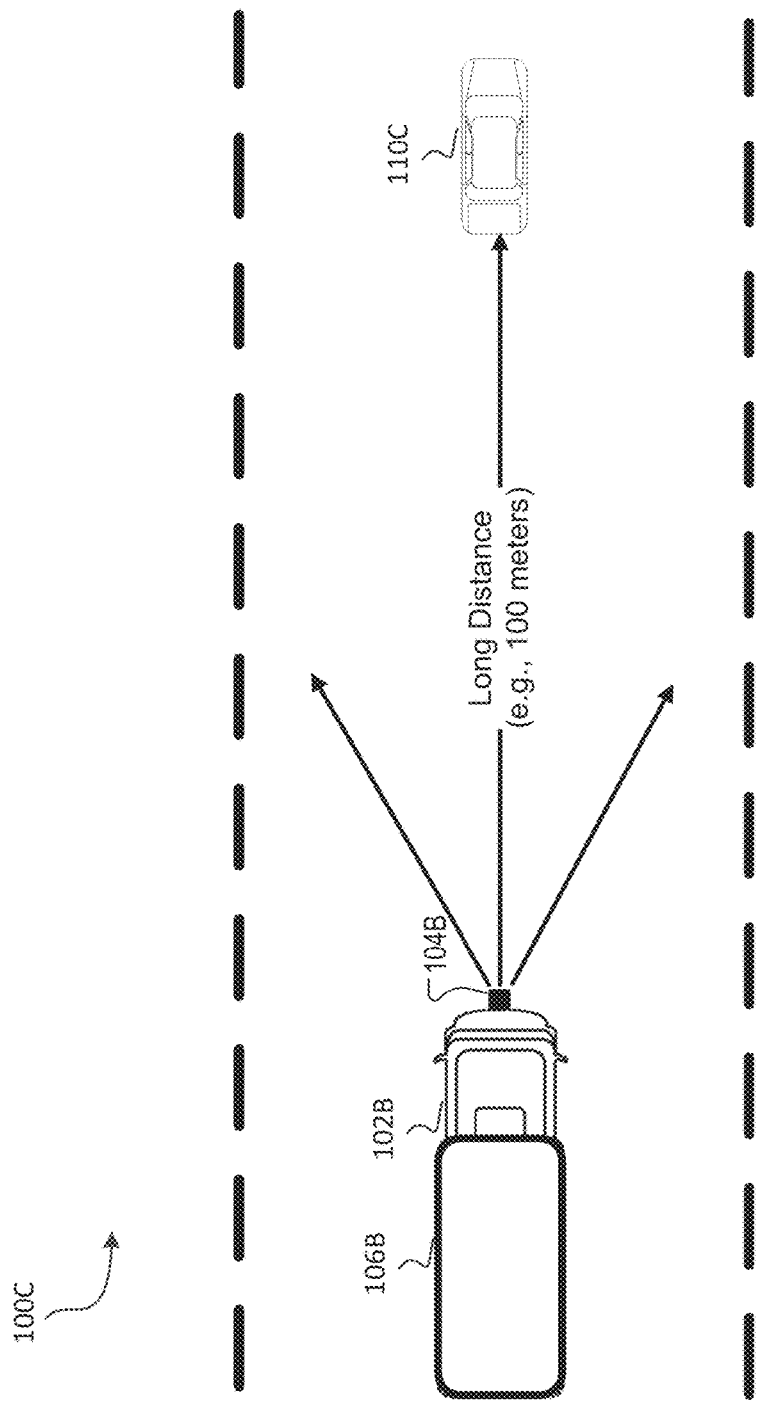
FIG. 1C is a block diagram of an example of a system environment for autonomous commercial trucking vehicles.

FIG. 1C is a block diagram illustrating an example of a system environment for autonomous commercial trucking vehicles, according to some implementations. The environment 100C includes the same components (e.g., commercial truck 102B, cargo 106B, LIDAR system 104B, etc.) that are included in environment 100B.

The environment 100C includes an object 110C (shown in FIG. 1C as another vehicle) that is within a distance range that is (i) more than 30 meters and (ii) equal to or less than 150 meters from the commercial truck 102B. As shown, the LIDAR system 104B in environment 100C may be configured to detect an object (e.g., another vehicle, a bicycle, a tree, street signs, potholes, etc.) at a distance (e.g., 100 meters) from the commercial truck 102B.

Figure 1D:
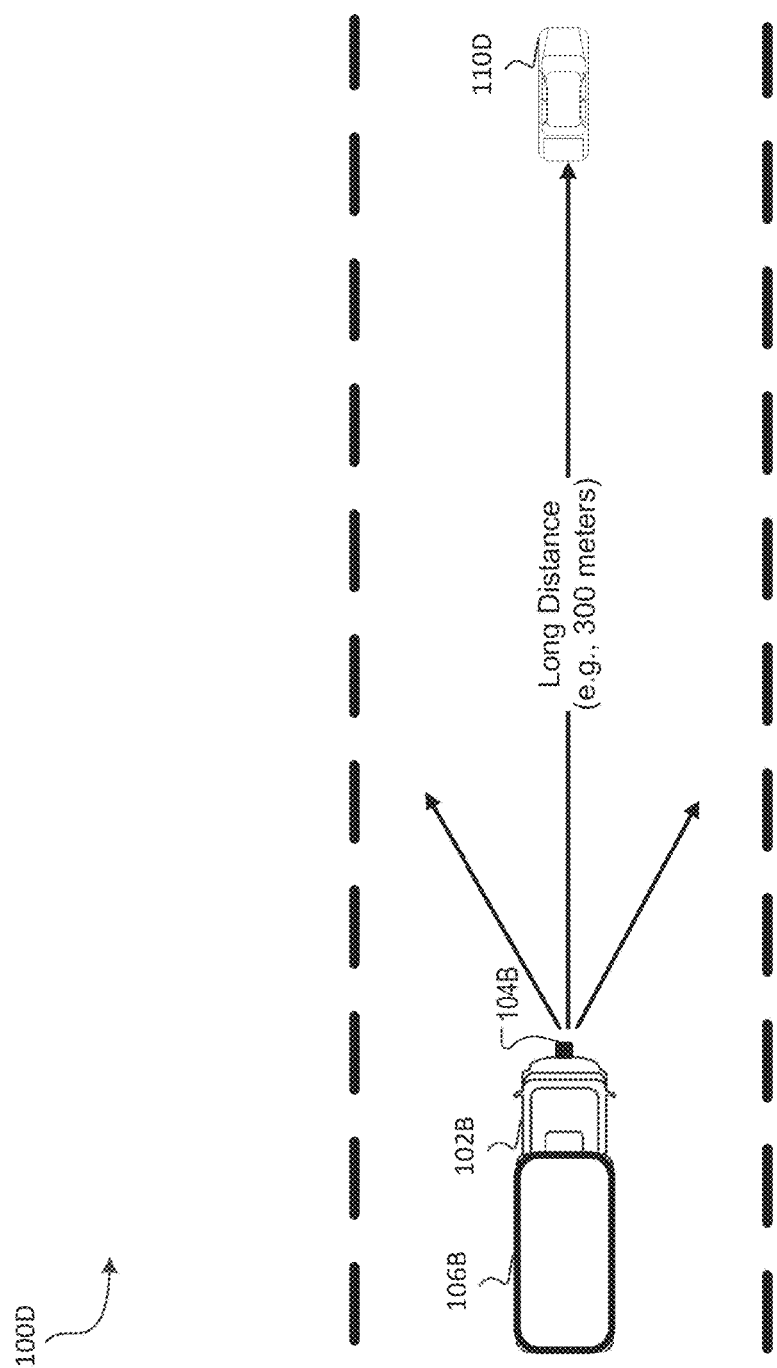
FIG. 1D is a block diagram of an example of a system environment for autonomous commercial trucking vehicles.

FIG. 1D is a block diagram illustrating an example of a system environment for autonomous commercial trucking vehicles, according to some implementations. The environment 100D includes the same components (e.g., commercial truck 102B, cargo 106B, LIDAR system 104B, etc.) that are included in environment 100B.

The environment 100D includes an object 110D (shown in FIG. 1D as another vehicle) that is within a distance range that is more than 150 meters from the commercial truck 102B. As shown, the LIDAR system 104B in environment 100D may be configured to detect an object (e.g., another vehicle, a bicycle, a tree, street signs, potholes, etc.) at a distance (e.g., 300 meters) from the commercial truck 102B.

In commercial trucking applications, it is important to effectively detect objects at all ranges due to the increased weight and, accordingly, longer stopping distance required for such vehicles. FM LIDAR systems (e.g., FMCW and/or FMQW systems) or PM LIDAR systems are well-suited for commercial trucking applications due to the advantages described above. As a result, commercial trucks equipped with such systems may have an enhanced ability to move both people and goods across short or long distances. In various implementations, such FM or PM LIDAR systems can be used in semi-autonomous applications, in which the commercial truck has a driver and some functions of the commercial truck are autonomously operated using the FM or PM LIDAR system, or fully autonomous applications, in which the commercial truck is operated entirely by the FM or LIDAR system, alone or in combination with other vehicle systems.

3. LIDAR Systems

FIG. 2 depicts an example of a LIDAR system 200. The LIDAR system 200 can be used to determine parameters regarding objects, such as range and velocity, and output the parameters to a remote system. For example, the LIDAR system 200 can output the parameters for use by a vehicle controller that can control operation of a vehicle responsive to the received parameters (e.g., vehicle controller 298) or a display that can present a representation of the parameters. The LIDAR system 200 can be a coherent detection system. The LIDAR system 200 can be used to implement various features and components of the systems described with reference to FIGS. 1A-1D. The LIDAR system 200 can include components for performing various detection approaches, such as to be operated as an amplitude modular LIDAR system or a coherent LIDAR system. The LIDAR system 200 can be used to perform time of flight range determination.

The LIDAR system 200 can include a laser source 204 that emits a beam 206, such as a carrier wave light beam. A splitter 208 can split the beam 206 into a beam 210 and a reference beam 212 (e.g., reference signal).

A modulator 214 can modulate one or more properties of the input beam 210 to generate a beam 216 (e.g., target beam). In some implementations, the modulator 214 can modulate a frequency of the input beam 210. For example, the modulator 214 can modulate a frequency of the input beam 210 linearly such that a frequency of the beam 216 increases or decreases linearly over time. As another example, the modulator 214 can modulate a frequency of the input beam 210 non-linearly (e.g., exponentially). In some implementations, the modulator 214 can modulate a phase of the input beam 210 to generate the beam 216. However, the modulation techniques are not limited to the frequency modulation and the phase modulation. Any suitable modulation techniques can be used to modulate one or more properties of a beam. Returning to FIG. 2, the modulator 214 can modulate the beam 210 subsequent to splitting of the beam 206 by the splitter 208, such that the reference beam 212 is unmodulated, or the modulator 214 can modulate the beam 206 and provide a modulated beam to the splitter 208 for the splitter 208 to split into a target beam and a reference beam.

The beam 216, which is used for outputting a transmitted signal, can have most of the energy of the beam 206 outputted by the laser source 204, while the reference beam 212 can have significantly less energy, yet sufficient energy to enable mixing with a return beam 248 (e.g., returned light) scattered from an object. The reference beam 212 can be used as a local oscillator (LO) signal. The reference beam 212 passes through a reference path and can be provided to a mixer 260. An amplifier 220 can amplify the beam 216 to output a beam 222, which a collimator 224 can collimate to output a beam 226.

As depicted in FIG. 2, a circulator 228 can be between the collimator 224 and optics 232 to receive the beam 226 and output a beam 230 to the scanning optics 232. The circulator 228 can be between the laser source 204 and the collimator 224. The circulator 228 can receive return beam 248 from the optics 232 and provide the return beam 248 to the mixer 260.

As described further herein, the optics 232 can include a first lens 236 and a second lens 240. The first lens 236 can receive the beam 230 (e.g., a first beam, such as the beam 206 from the laser source 204 or various other beams generated by components of the LIDAR system 200, such as the beam 226), and output a beam 238 to the second lens 240 responsive to the beam 230. The second lens 240 can output a beam 242 responsive to the beam 238. The first lens 236 can cause deflection of the beam 230 to output the beam 238 (e.g., in a particular plane), and the second lens 240 can cause deflection of the beam 238 to output the beam 242 (e.g., in the particular plane). The deflections caused by the lenses 236, 240 can be used to control the angle of the beam 242. The angle of the beam 242 over time can be substantially linear (e.g., less than a threshold difference from a linear or triangular waveform, such as a difference determined based on mean squared error).

The lenses 236, 240 can be ground or polished lenses. The lenses 236, 240 can be made from glass or crystalline materials. The lenses 236, 240 can be transparent to light over a range of wavelengths that includes a wavelength of the beam 206 or various other beams between the laser source 204 and the optics 232, such as a wavelength of about 1550 nm. The lenses 236, 240 can have indices of refraction from about 1.5 to about 4, including 1.8, or 3.5; for example, increased indices of refraction can enable a greater angular deflection of the beam 242 relative to articulation of at least one of the lens 236 or the lens 240. The indices of refraction of the lenses 236, 240 can be within a threshold of one another, such as within twenty percent of one another. The radii of curvature of the curved surfaces of the lenses 236, 240 can be within a threshold of one another, such as within twenty percent of one another.

The lenses 236, 240 can include curved (e.g., concave, convex) surfaces oriented in a direction facing where an incoming beam (e.g., beam 230) is received or opposite where the incoming beam is received. The lenses 236, 240 can be implemented using Fresnel lenses. The lenses 236, 240 can be implemented using flattened cylindrical lenses. One or both of the lenses 236, 240 can be articulated; for example, articulating both lenses 236, 240 can enable balancing angular momentum between the movements and reducing a form factor of the optics 232. The curved surfaces of the lenses 236, 240 can enable the articulation to control of angles of beams received and deflected by the lenses 236, 240 in one or more degrees of freedom corresponding to directions of curvature along the curved surfaces.

The optics 232 can define a field of view 244 that corresponds to angles scanned (e.g., swept) by the beam 242 (e.g., a transmitted beam) based on at least one of deflection caused by the first lens 236 or deflection caused by the second lens 240. For example, the beam 242 can be scanned in the particular plane, such as an azimuth plane or elevation plane (e.g., relative to an object to which the LIDAR system 200 is coupled, such as an autonomous vehicle). For example, as an orientation of at least one of the first lens 236 changes relative to a direction of the beam 230 incident on the first lens 236 or the second lens 240 changes relative to a direction of the beam 238 incident on the second lens 240, an angle (e.g., azimuth angle) of the beam 242 will change, enabling the optics 232 to scan over the field of view 244. The optics 232 can be oriented so that the field of view 244 sweeps an azimuthal plane relative to the optics 232.

The beam 242 can be outputted from the optics 232 and reflected or otherwise scattered by an object (not shown) as a return beam 248 (e.g., return signal). The return beam 248 can be received on a reception path, which can include the circulator 228, and provided to the mixer 260.

The mixer 260 can be an optical hybrid, such as a 90 degree optical hybrid. The mixer 260 can receive the reference beam 212 and the return beam 248, and mix the reference beam 212 and the return beam 248 to output a signal 264 responsive to the reference beam 212 and the return beam 248. The signal 264 can include an in-phase (I) component 268 and a quadrature (Q) component 272.

The LIDAR system 200 can include a receiver 276 that receives the signal 264 from the mixer 260. The receiver 276 can generate a signal 280 responsive to the signal 264, which can be an electronic (e.g., radio frequency) signal. The receiver 276 can include one or more photodetectors that output the signal 280 responsive to the signal 264.

The LIDAR system 200 can include a processing system 290, which can be implemented using features of the vehicle control system 120 described with reference to FIG. 1A. The processing system 290 can process data received regarding the return beam 248, such as the signal 280, to determine parameters regarding the object such as range and velocity. The processing system 290 can include a scanner controller 292 that can provide scanning signals to control operation of the optics 232, such as to control articulation of the optics 232. The processing system 290 can include a Doppler compensator 294 that can determine the sign and size of a Doppler shift associated with processing the return beam 248 and a corrected range based thereon along with any other corrections. The processing system 290 can include a modulator controller 296 that can send one or more electrical signals to drive the modulator 214.

The processing system 290 can include or be communicatively coupled with a vehicle controller 298 to control operation of a vehicle for which the LIDAR system 200 is installed (e.g., to provide complete or semi-autonomous control of the vehicle). For example, the vehicle controller 298 can be implemented by at least one of the LIDAR system 200 or control circuitry of the vehicle. The vehicle controller 298 can control operation of the vehicle responsive to at least one of a range to the object or a velocity of the object determined by the processing system 290. For example, the vehicle controller 298 can transmit a control signal to at least one of a steering system or a braking system of the vehicle to control at least one of speed or direction of the vehicle.

Figure 3A:
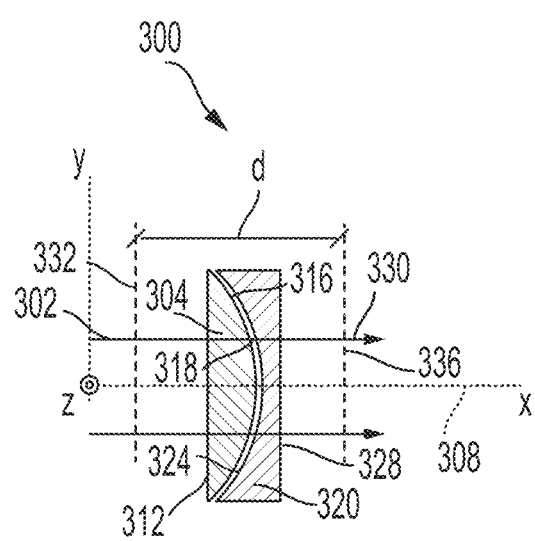
FIG. 3A is a schematic diagram of an example of optics of a LIDAR system that include cylindrical lenses.
Figure 3C:
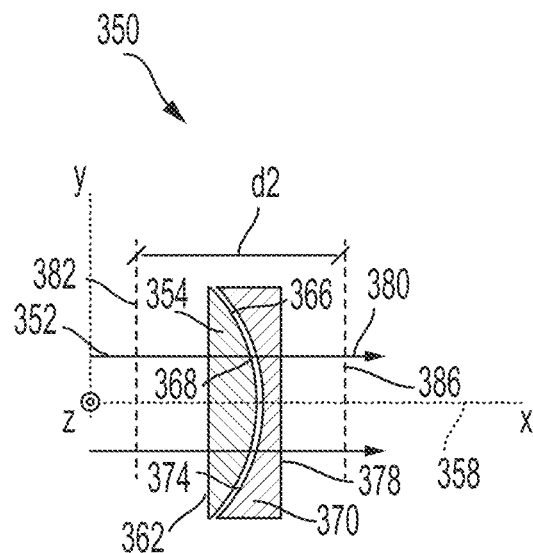
FIG. 3C is a schematic diagram of an example of optics of a LIDAR system that include spherical lenses.
Figure 3B:
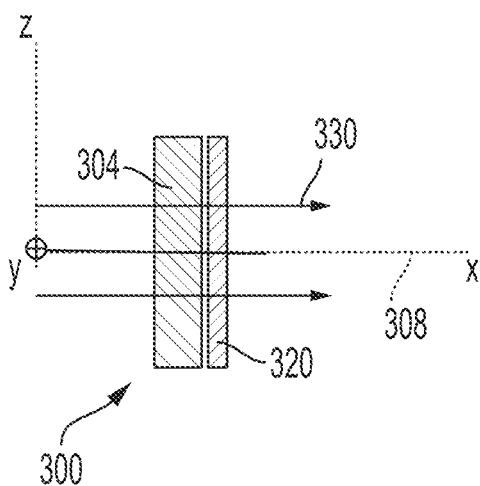
FIG. 3B is a cross-section of an example of the optics of FIG. 3A.

FIGS. 3A and 3B depict an example of a system 300, which can be used to implement at least a portion of the LIDAR system 200 described with reference to FIG. 2, such as the optics 232. For example, as depicted in FIGS. 3A and 3B, the system 300 can include a first lens 304 (which can be used to implement the first lens 236 of FIG. 2) and a second lens 320 (which can be used to implement the second lens 240 of FIG. 2).

The first lens 304 can receive a beam 302 along an optical axis 308 (e.g., as depicted, various rays of the beam 302 can extend along or parallel to the optical axis 308). In the frame of reference and arrangement of the first lens 304 and second lens 320 of FIGS. 3A and 3B, the x-z and x-y planes can be orthogonal to the optical axis 308, which can be orthogonal to a first, planar portion 312, such as at least a portion of a planar surface, of the first lens 304. The first lens 304 can include a second, convex portion 316, such as at least a portion of a curved surface. The second portion 316 can be on an opposite side of the first portion 312 from which the beam 302 is received. For example, the first lens 304 can be a cylindrical plano-convex lens, where the first portion 312 forms the planar surface of the plano-convex lens and the second portion 316 forms the cylindrical convex surface of the plano-convex lens. The second convex portion 316 can output (e.g., deflect) the beam 302 to provide a beam 318.

The second lens 320 can be spaced from the first lens 304 on an opposite side of the first lens 304 from which the beam 302 is received, and can receive the beam 318 from the first lens 304. The second lens 320 can include a third, concave portion 324, such as at least a portion of a concave cylindrical surface, at which the beam 318 is received, and a fourth, planar portion 328, such as at least a portion of a planar surface, on an opposite side of the second lens 320 from the third portion 324. For example, the second lens 320 can be a cylindrical plano-concave lens, in which the third portion 324 forms the cylindrical concave surface of the plano-concave lens and the fourth portion 328 forms the planar surface of the plano-concave lens.

The third portion 324 can receive the beam 318 from the first lens 304, and the fourth portion 328 can output (e.g., deflect) the beam 318 as a beam 330. In the arrangement depicted in FIGS. 3A and 3B in which the first portion 312 is orthogonal to the optical axis 308 of the beam 302 and the fourth portion 328 is orthogonal to the optical axis 308 (and thus the first portion 312 and fourth portion 328 are parallel), the beam 330 can be outputted in a same direction as the beam 302, such as along the optical axis 308.

A first optical power (e.g., 1/focal length) of the first lens 304 along the optical axis 308 can be equal to a second optical power of the second lens 320 with respect to relative spacing of the lenses 304, 320. As such, a net effect on the incident light of the beam 302, at least within a threshold distance of the optical axis 308 in a propagation direction parallel to the optical axis 308, can be negligible. The first lens 304 can have a first observation plane 332, and the second lens 320 can have a second observation plane 336, defining a distance d1 between the observation planes. Such an arrangement can correspond to a product of a first transformation matrix of the first lens 304 and a second transformation matrix of the second lens 320 being nominally equal (e.g., within five percent of equal) to [1, d1; 0, 1] in the arrangement in which the first portion 312 and the fourth portion 328 are parallel. As such, where the beam 302 is a Gaussian beam of low divergence (e.g., a collimated beam), a beam quality can be maintained throughout the system 300.

Figure 3D:
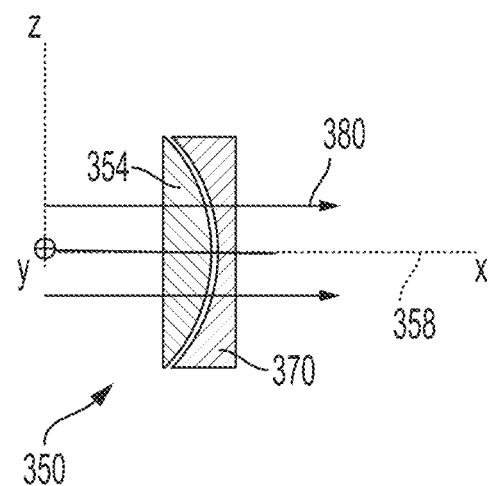
FIG. 3D is a cross-section of an example of the optics of FIG. 3C.

FIGS. 3C and 3D depict an example of a system 350, which can be used to implement at least a portion of the LIDAR system 200 described with reference to FIG. 2, such as the optics 232. For example, as depicted in FIGS. 3C and 3D, the system 350 can include a first lens 354 (which can be used to implement the first lens 236 of FIG. 2) and a second lens 370 (which can be used to implement the second lens 240 of FIG. 2). The system 350 can be similar to the system 300, and use spherical surfaces for the curved features of the lenses 354, 370.

For example, the first lens 354 can receive a beam 352 along an optical axis 358 (e.g., as depicted, various rays of the beam 352 can extend along or parallel to the optical axis 358). In the frame of reference and arrangement of the first lens 354 and second lens 370 of FIGS. 3C and 3D, the x-z and x-y planes can be orthogonal to the optical axis 358, which can be orthogonal to a first, planar portion 362, such as at least a portion of a planar surface, of the first lens 354. The first lens 354 can include a second, convex portion 366, such as at least a portion of a curved surface. For example, the first lens 354 can be a spherical plano-convex lens, where the first portion 362 forms the planar surface of the plano-convex lens and the second portion 366 forms the spherical convex surface of the plano-convex lens. The second convex portion 366 can output (e.g., deflect) the beam 352 to provide a beam 368.

The second lens 370 can be spaced from the first lens 354 on an opposite side of the first lens 354 from which the beam 352 is received, and can receive the beam 368 from the first lens 354. The second lens 370 can include a third, concave portion 374, such as at least a portion of a concave spherical surface, at which the beam 368 is received, and a fourth, planar portion 378, such as at least a portion of a planar surface, on an opposite side of the second lens 370 from the third portion 374. For example, the second lens 370 can be a spherical plano-concave lens, in which the third portion 374 forms the cylindrical concave surface of the plano-concave lens and the fourth portion 378 forms the planar surface of the plano-concave lens.

The third portion 374 can receive the beam 368 from the first lens 354, and the fourth portion 378 can output (e.g., deflect) the beam 368 as a beam 380. In the arrangement depicted in FIGS. 3C and 3D in which the first portion 362 is orthogonal to the optical axis 358 of the beam 352 and the fourth portion 378 is orthogonal to the optical axis 358 (and thus the first portion 362 and fourth portion 378 are parallel), the beam 380 can be outputted in a same direction as the beam 352, such as along the optical axis 358.

Similar to the lenses 304, 320, a first optical power of the first lens 354 along the optical axis 358 can be equal to a second optical power of the second lens 370 with respect to relative spacing of the lenses 354, 370. The first lens 354 can have a first observation plane 382, and the second lens 370 can have a second observation plane 386, defining a distance d2 between the observation planes. Such an arrangement can correspond to a product of a first transformation matrix of the first lens 354 and a second transformation matrix of the second lens 370 being nominally equal (e.g., within five percent of equal) to [1, d2; 0, 1] in the arrangement in which the first portion 362 and the fourth portion 378 are parallel.

At least one of the first lens 304 or the second lens 320 can be articulated to control a direction of the beam 330, such as to perform beam steering of the beam 330. At least one of the first lens 304 or the second lens 320 can define a center of curvature 301 (e.g., relative to respective curved portions 316, 324) about which the at least one of the first lens 304 or the second lens 320 can be articulated. For example, the at least one of the first lens 304 or the second lens 320 can be articulated about a rotation axis that extends through the center of curvature 301 and coincides with the z axis in the frame of reference depicted with respect to FIGS. 3A and 3B. For example, the at least one of the first lens 304 or the second lens 320 can be articulated in a plane of curvature, such as the x-y plane depicted with respect to FIGS. 3A and 3B. For the cylindrical shape of the curved portions 316, 324, the x-y plane can be a single plane of articulation (e.g., other rotations may result in the curved portions 316, 324 contacting one another or other undesired changes to the system 300).

Figure 4A:
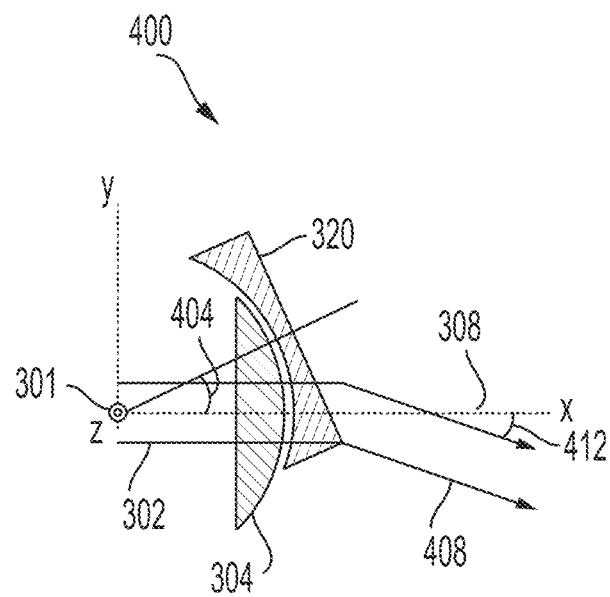
FIGS. 4A and 4B are schematic diagrams of examples of articulation of a lens using the LIDAR system of FIGS. 3A and 3B.
Figure 4B:
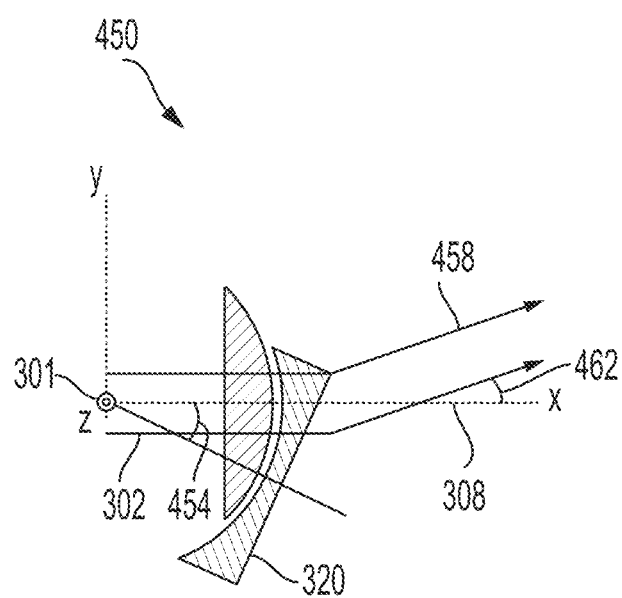

FIGS. 4A and 4B depict examples of articulations 400, 450 respectively of the second lens 320 with respect to the first lens 304. For example, the second lens 320 can be bidirectionally articulated, and can be articulated in open loop or closed loop control schemes as described further herein. For example, the second lens 320 can be an articulated plano-concave lens, while the first lens 304 is a static plano-convex lens. For the example of articulation 400, the second lens 320 is articulated by an angle 404 defined between the center of curvature 301 and the optical axis 308. The beam 302 passes through the cylindrical pairing defined by the surfaces of the cylindrical portions 316, 324, and is deflected by refraction to be outputted at the fourth portion 328 as a beam 408, which has an angle 412 (corresponding to deflection in the x-y plane) relative to the optical axis 308 (and relative to the x-z plane).

For the example of articulation 450, the second lens 320 is articulated by an angle 454 defined between the center of curvature 301 and the optical axis 308. The beam 302 is deflection by refraction to be outputted at the fourth portion 328 as a beam 458, which has an angle 462 (corresponding to deflection in the x-y plane) relative to the optical axis 308 (and relative to the x-z plane).

Figure 5:
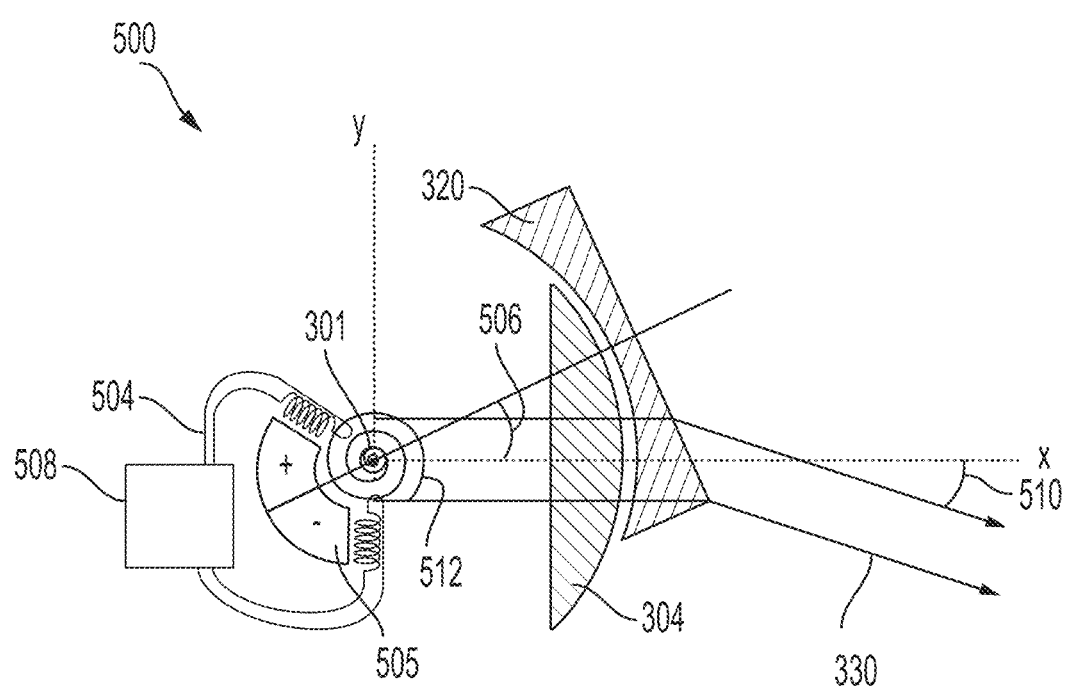
FIG. 5 is a schematic diagram of an example of a LIDAR system.

FIG. 5 depicts an example of a system 500 that can articulate the at least one of the first lens 304 or the second lens 320. For example, the system 500 can articulate the at least one of the first lens 304 or the second lens 320 in a manner corresponding to an inhomogenous second order dynamical system with damping. As such, the system 500 can achieve relatively large sinusoidal angular motion of at least one of the first lens 304 or the second lens 320 with relatively little torque applied from actuator 504 as described herein.

The system 500 can include at least one actuator 504 that can be coupled to at least one of the first lens 304 or the second lens 320. The actuator 504 can include a direct current (DC) motor, such as a permanent magnet DC motor 505. The actuator 504 can operate as a synchronous motor. The actuator 504 can include a voice coil.

The actuator 504 can include or be coupled with a controller 508 (e.g., drive electronics) that controls operation of the actuator 504 to control rotation of the at least one of the first lens 304 or the second lens 320. The controller 508 can include a motor control unit to control operation of the actuator 504.

For example, as depicted in FIG. 5, the actuator 504 can be coupled to the second lens 320 to cause rotation of the second lens 320 by an angle 506 in the x-y plane relative to the optical axis 308, resulting in a deflection of the beam 330 by an angle 510 in the x-y plane relative to the optical axis 308. The actuator 504 can cause sinusoidal control of the angle 506 of rotation of the second lens 320.

The system 500 can include at least one energy storage element 512, such as a mechanical energy storage element that stores energy mechanically in response to a force applied to the energy storage element 512. The energy storage element 512 can be a spring or a flexure (e.g., flexure 708 described with respect to FIG. 7A). The energy storage element 512 can apply a linear restorative force to the at least one of the first lens 304 or the second lens 320 articulated by the actuator 504. For example, the energy storage element 512 can be a spring (e.g., a torsional spring) coupled to the at least one of the first lens 304 or the second lens 320. The energy storage element 512 can be positioned at the center of curvature 301, such as to be aligned with the z axis to apply a linear restorative force to the at least one of the first lens 304 or the second lens 320 in a direction towards the optical axis 308 in the x-y plane (e.g., in a direction opposite the articulation of the at least one of the first lens 304 or the second lens 320 away from the optical axis 308 as caused by the actuator 504). For example, the energy storage element 512 can be fixed to a pivot point at the center of curvature 301.

Figure 6:
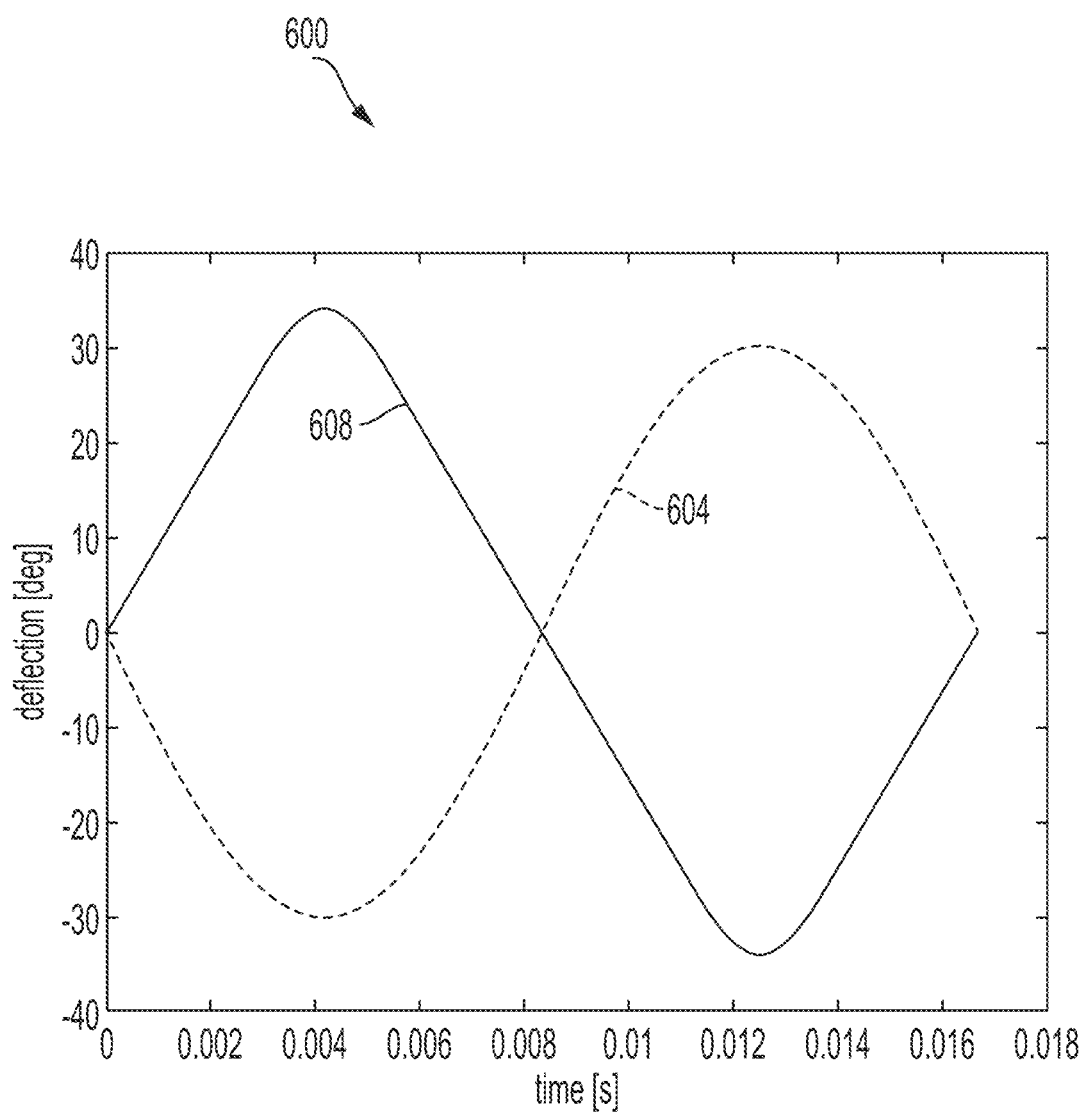
FIG. 6 is a chart of an example of angle profiles of lens articulation and beam output using the LIDAR system of FIG. 5.

FIG. 6 depicts an example of a chart 600 of an angle profile 604 corresponding to the angle 506 of articulation of the second lens 320 using the system 500, and an angle profile 608 corresponding to the angle 510 of the beam 330 resulting from the articulation of the second lens 320 using the system 500. The angle profiles 604, 608 correspond to angles (e.g., angles of deflection) over time (e.g., as depicted, deflection in degrees and time in seconds), in an example in which the lenses 304, 320 each have indices of refraction of 1.8, and the second lens 320 is articulated with an amplitude of 30 degrees at 60 Hz.

The angle profile 608 can be highly linear in time. For example, the angle profile 608 can be highly linear in time for large deflections of the second lens 320, enabling a constant scan speed and constant point density along the line of scan corresponding to the beam 330 outputted from the second lens 320. For various examples of control of the angle 510 of the beam 330 using the system 500, the angle profile 608 can be within eighty percent of linear over an angle range between negative forty five degrees and positive forty five degrees. The angle profile 608 can have a mean squared error relative to a triangular waveform (e.g., of same magnitude (for the example depicted, 30 degrees) and frequency (for the example depicted, of 60 Hz) less than about one percent, such as less than about $1e^{-3}$.

FIG. 7A depicts an example of a system 700 that can articulate at least one of the first lens 304 or the second lens 320. The system 700 can be similar to the system 500. For example, the system 700 can include the controller 508 of the system 500 to control operation of an actuator that incorporates features of the actuator 504.

The system 700 includes a flexure 708 (e.g., actuated flexure) to operate as a biasing element (e.g., to perform a similar function as the energy storage element 512 described with reference to FIG. 5). The flexure 708 can be useful for optical scanning, as it can be provided as a monolithic, frictionless component having infinite resolution, and can operate indefinitely. For example, the movement of the flexure 708 can be within an endurance limit of the flexure 708, eliminating structural fatigue over time.

For example, the flexure 708 can include a first flexure 712 and a second flexure 716. The flexures 712, 716 can be arranged in series and can be centered on the center of curvature 301 of the at least one of the first lens 304 or the second lens 320. The flexures 712, 716 can be leaf-type isosceles trapezoidal flexures.

The actuator of the system 700 can include or be coupled with a rotor 720 and a stator (not shown). The rotor 720 can be a permanent magnet rotor. The stator can be a coil stator, such as an electromagnetic coil that receives electrical current from a power supply included in or coupled with the controller 508 (e.g., the electrical current can correspond to a control signal from the controller 508 to control rotation of the rotor 720 using the stator). Responsive to the control signal (e.g., from controller 508), the actuator can articulate the at least one of the first lens 304 or the second lens 320, such as to articulate the at least one of the first lens 304 or the second lens 320 sinusoidally over time, by controlling operation of the stator, including to apply a magnetic moment to end 724 of the flexure 716. The end 724 can be grounded (e.g., fixed to a fixed point, such as a vehicle or a member fixed relative to a vehicle associated with the system 700). The movement (e.g., sinusoidal deflection) of the flexure 716 can be offset by the translation of the end 724 of the flexure 716, which is coupled to a member 728 (see FIGS. 7B, 7C) opposite the end 724. As such, structural effects on the flexure 716 due to movement over time can be reduced or minimized, extending longevity of the flexure 708, and the lens 320 can be controlled to perform similar or identical movement to the rigid body movement about the center of curvature 301 as described with respect to the system 500.

The flexure 708 can be implemented in various combinations of multiple instances of the flexure 708, including connecting flexures 708 in at least one of series or parallel arrangements. Such combinations can facilitate indefinite lifespan of the flexures 708 and stiffness for operating in a harmonically resonant configuration within a target range of scan rates. FIG. 7B depicts an example of a flexure assembly 750 that can be used to implement the flexure 708 described with reference to FIG. 7A. The flexure assembly 750 include one or more flexures 754 that are connected (e.g., grounded in position) to the member 728 to enable center translation of the flexures 754 back towards the member 728 to mitigate parasitic movement associated with deflection of the flexures 754. For example, as depicted in the finite element analysis (FEM) diagram 780 of FIG. 7C showing motion of the second lens 320 using the flexure 754, the flexure 754 can remain grounded to the member 728 while the second lens 320 is articulated.

Figure 8A:
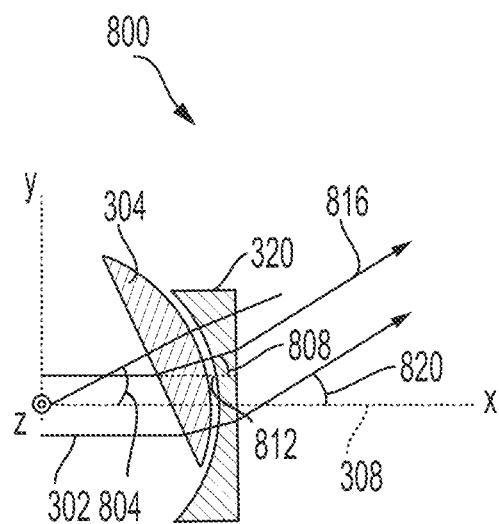
FIGS. 8A and 8B are schematic diagrams of examples of articulation of a lens using various LIDAR systems described herein.
Figure 8B:
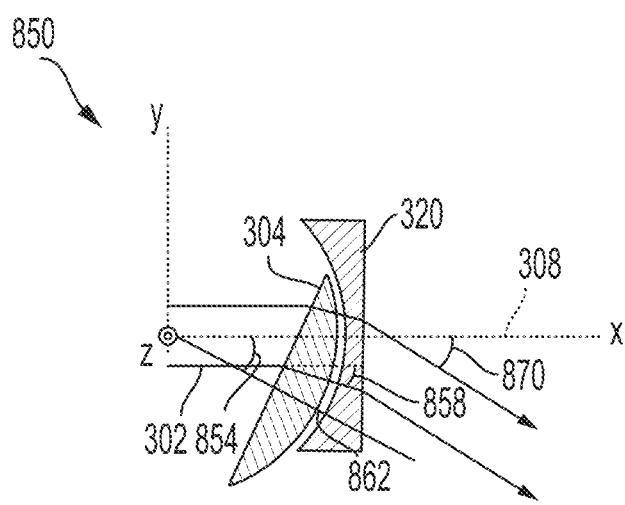

FIGS. 8A and 8B depict examples of articulations 800, 850 in which the first lens 304 is articulated (e.g., using features of the system 500 or the system 700), while the second lens 320 is maintained in a static position. For example, the first lens 304 can be a plano-convex scanning lens, and the second lens 320 can be a static plano-concave lens. Providing the second lens 320 as a plano-concave lens can enable the second lens 320 to be an environmentally sealed optical window to an exterior of a device that includes the lenses 304, 320, which can reduce component count and volumetric size of the device.

As depicted in FIG. 8A, the beam 302 can be received by the first portion 312, which defines an angle 804 (defined in the x-y plane relative to the optical axis 308). The beam 302 can be deflected by the first lens 304 (e.g., at second portion 316) by an angle 808 (corresponding to the angle 804 and defined in the x-y plane relative to the optical axis 308) to be outputted as a beam 812. The beam 812 can be received by the third portion 324, and can be deflected by the fourth portion 328 to be outputted as a beam 816 at an angle 820 defined in the x-y plane relative to the optical axis 308.

As depicted in FIG. 8B, the beam 302 can be received by the first portion 312, which defines an angle 854 (defined in the x-y plane relative to the optical axis 308). The beam 302 can be deflected by the first lens 304 (e.g., at second portion 316) by an angle 858 (corresponding to the angle 854 and defined in the x-y plane relative to the optical axis 308) to be outputted as a beam 862. The beam 862 can be received by the third portion 324, and can be deflected by the fourth portion 328 to be outputted as a beam 866 at an angle 870 defined in the x-y plane relative to the optical axis 308.

Figure 9:
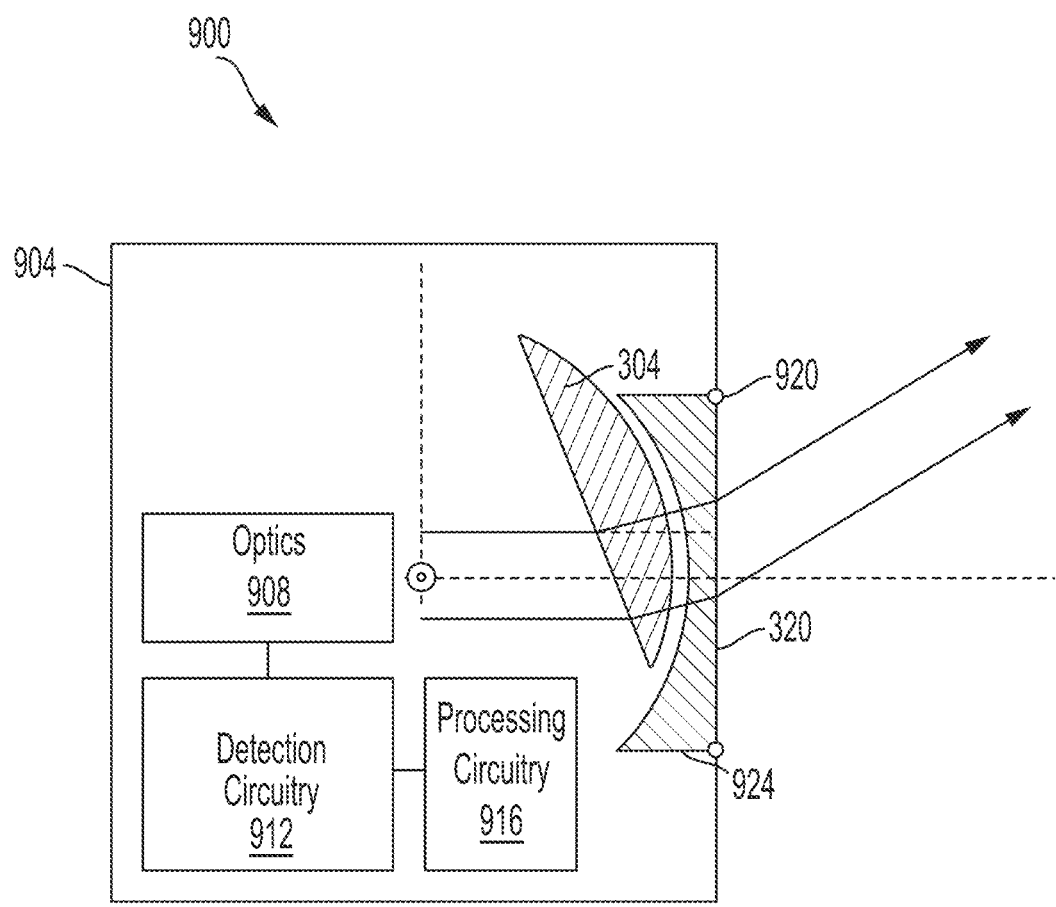
FIG. 9 is a schematic diagram of an example of a LIDAR system.

FIG. 9 depicts an example of a system 900 to implement at least some features of the LIDAR system 200 and the system 300 in a manner as described with reference to FIGS. 8A and 8B. The system 900 can include an enclosure 904, such as a sealed housing. The system 900 can include optics 908 (e.g., transmission and receiver optics) positioned within the enclosure 904. For example, the optics 908 can include components such as at least one of the laser source 204, splitter 208, modulator 214, amplifier 220, collimator 224, circulator 228, or mixer 260 described with reference to FIG. 2, and can include components such as an actuator (e.g., actuator 504) to control articulation of the first lens 304. The optical axis 308 can be aligned with the optics 908. The system 900 can include detection circuitry 912 positioned within the enclosure 904 and coupled with the optics 908. For example, the detection circuitry 912 can include the receiver 276 described with reference to FIG. 2. The system 900 can include processing circuitry 916 positioned within the enclosure 904 and coupled with the optics 908 and detection circuitry 912. The processing circuitry 916 can be used to control articulation of the first lens 304 (e.g., by controlling an actuator such as the actuator 504 coupled with the energy storage element 512 or an actuator coupled with the flexure 708, such as to perform a resonant sinusoidal control of the first lens 304, or the actuator coupled with the flexure 708). The processing circuitry 916 can include or be coupled with a position sensor to detect a position, including an angular position relative to the optical axis 308, of at least one of the first lens 304 or the second lens 320. The processing circuitry 916 can be used to perform at least some control and processing for determining at least one of a range to or a velocity of an object, such as by including components of the processing system 290 such as the scanner controller 292, Doppler compensator 294, or modulator controller 296. The processing circuitry 916 can include or be communicatively coupled with the vehicle controller 298 (e.g., can be connected by a wired or wireless connection with one or more processors of an autonomous vehicle to which the system 900 is attached that implement the vehicle controller 298).

The second lens 320 can be positioned within and attached to the enclosure 904. For example, the system 900 can include a seal 920, such as a sealing bezel, that attaches the second lens 320 with the enclosure 904. The enclosure 904 can define an opening 924 that extends into the enclosure 904 and receives the second lens 320 and the seal 920.

Figure 10A:
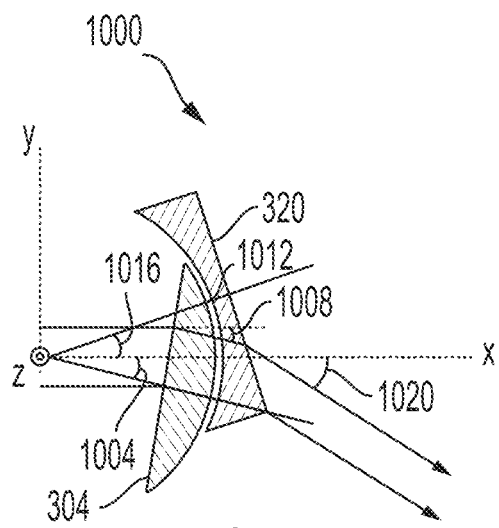
FIGS. 10A and 10B are schematic diagrams of examples of articulation of two lenses of a LIDAR system.
Figure 10B:
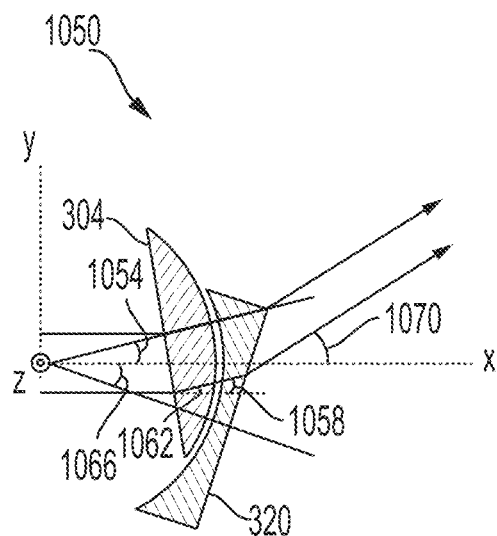

FIGS. 10A and 10B depicts examples of articulations 1000, 1050 in which both the first lens 304 and the second lens 320 are articulated (e.g., both articulated in the x-y plane). As depicted in FIG. 10A, the beam 302 can be received at the first portion 312, which has been rotated by an angle 1004 relative to the optical axis 308 in the x-y plane, such that the beam 302 is deflected to be outputted by the second portion 316 at an angle 1008 relative to the optical axis 308 in the x-y plane as a beam 1012. The beam 1012 can be received at the third portion 324, which has been rotated at an angle 1016 relative to the optical axis 308 in the x-y plane, such that the beam 1012 is deflected to be outputted by the fourth portion 328 at an angle 1020 relative to the optical axis 308 in the x-y plane.

As depicted in FIG. 10B, the beam 302 can be received at the first portion 312, which has been rotated by an angle 1054 relative to the optical axis 308 in the x-y plane, such that the beam 302 is deflected to be outputted by the second portion 316 at an angle 1058 relative to the optical axis 308 in the x-y plane as a beam 1062. The beam 1062 can be received at the third portion 324, which has been rotated at an angle 1066 relative to the optical axis 308 in the x-y plane, such that the beam 1062 is deflected to be outputted by the fourth portion 328 at an angle 1070 relative to the optical axis 308 in the x-y plane.

Figure 11:
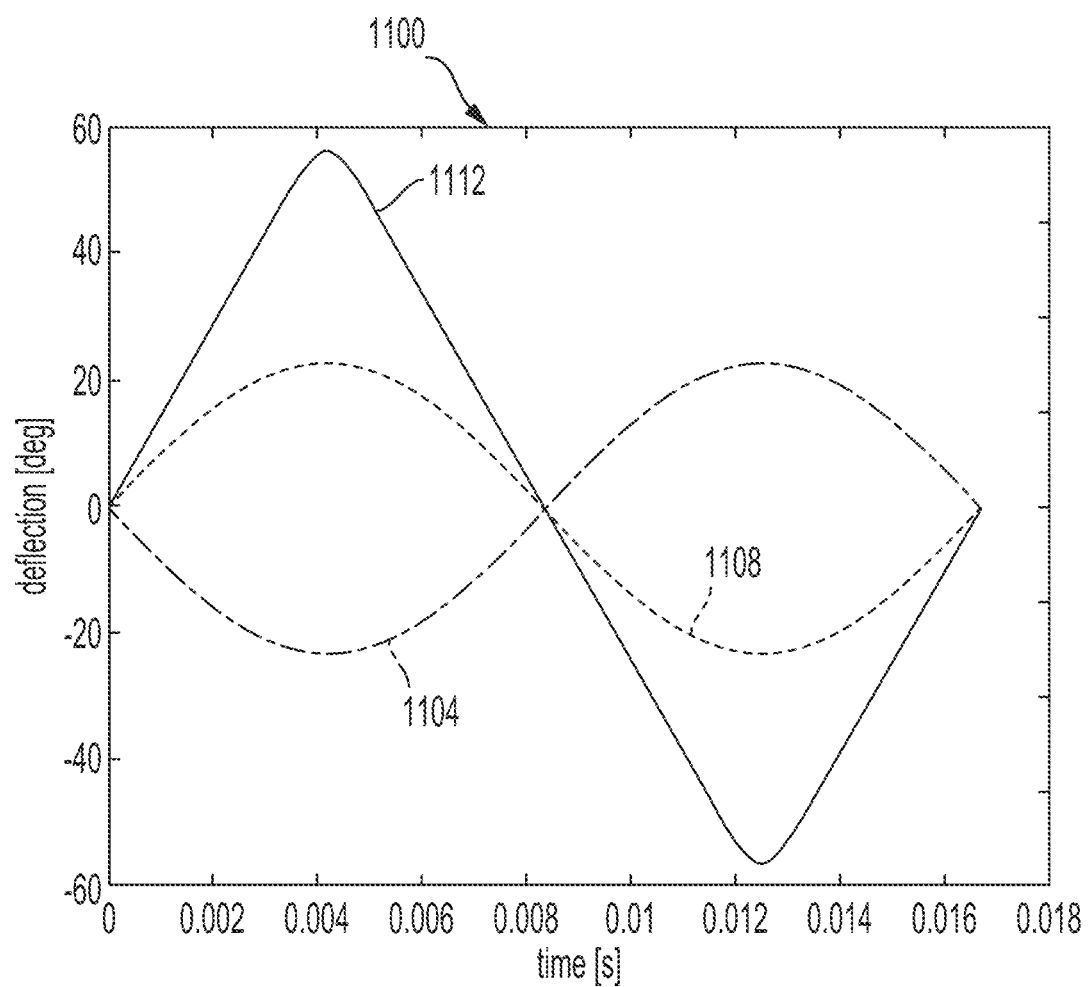
FIG. 11 is a chart of an example of angle profiles of lens articulation and beam output using the LIDAR system of FIGS. 10A and 10B.

FIG. 11 depicts an example of a chart 1100 of an angle profile 1104 corresponding to rotation of the first lens 304, an angle profile 1108 corresponding to rotation of the second lens 320, and a resulting angle profile 1112 of the beam outputted by the lenses 304, 320 in accordance with articulations such as those described with respect to FIGS. 10A and 10B. In the example depicted with respect to FIG. 11, the lenses 304, 320 have refractive indices of 1.8, and are articulated at an amplitude of 22.5 degrees at a rate of 60 Hz. The angle profile 1112 can be a substantially triangular waveform (e.g., triangular over a half cycle of articulation of the lenses from zero degrees to a maximum positive angle deflection and back to zero degrees, or a full cycle from zero degrees to a maximum positive angle deflection, back to zero degrees, to a maximum negative angle deflection, and back to zero degrees) of amplitude of about 55 degrees. For example, the angle profile 1112 can have a mean squared error relative to a triangular waveform (e.g., a waveform that has linear segments over the corresponding period of time) that is less than a threshold mean squared error, such as a threshold of 0.1 or 0.01; for the example depicted with respect to FIG. 11, the mean squared error is 0.0001, which can represent a one hundred times improvement as compared to an angle profile that is sinusoidal.

Various features of the systems 500, 700 as described with respect to FIGS. 4A-11 can be implemented to articulate at least one of the spherical lenses 354, 370 as described with reference to FIGS. 3C and 3D. Articulation of at least one of the first lens 354 or the second lens 370 can be performed with greater degrees of freedom than for the lenses of the system 300, due to the spherical shape of the lenses 354, 370 (including, for example and among others, directions 1201 depicted in FIG. 12). For example, articulation can be performed with respect to various planes of articulation that allow for the spherical surfaces of the lenses 354, 370 to be aligned about the optical axes of the lenses 354, 370 (e.g., radially symmetric optical axes), such as planes of articulation in which the optical axes wholly lie in the planes.

Figure 12:
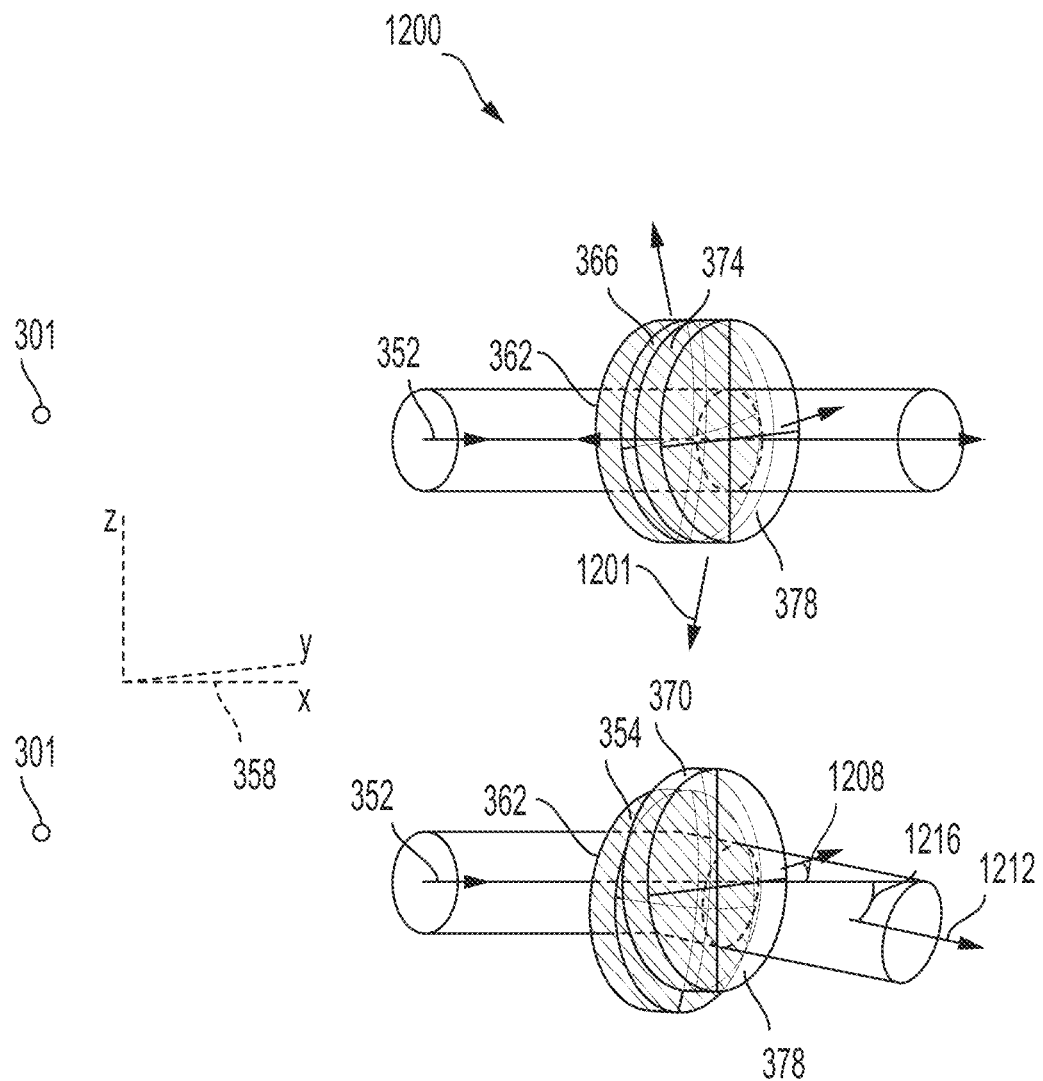
FIG. 12 is a schematic diagram of an example of articulation of a LIDAR system using spherical lenses.

FIG. 12 depicts an example of an articulation 1200 that can be performed using the lenses 354, 370, in which the second lens 370 is articulated relative to the first lens 354. As depicted in FIG. 12, the beam 352 can be received along the optical axis 358 at the first portion 362, and pass through the first lens 354 to be outputted by the second portion 366 as a beam (not shown) to the third portion 374 of the second lens 370. The second lens 370 has been articulated by an angle 1208 with respect to the optical axis 358 (e.g., rotated about center of curvature 351), such that the beam is deflected by the second lens 370 to be outputted from the fourth portion 378 as a beam 1212 having an angle 1216 relative to the optical axis 358. The optical axis 358 and the beams 352, 1204, and 1212 can lie in a same plane.

Figure 13:
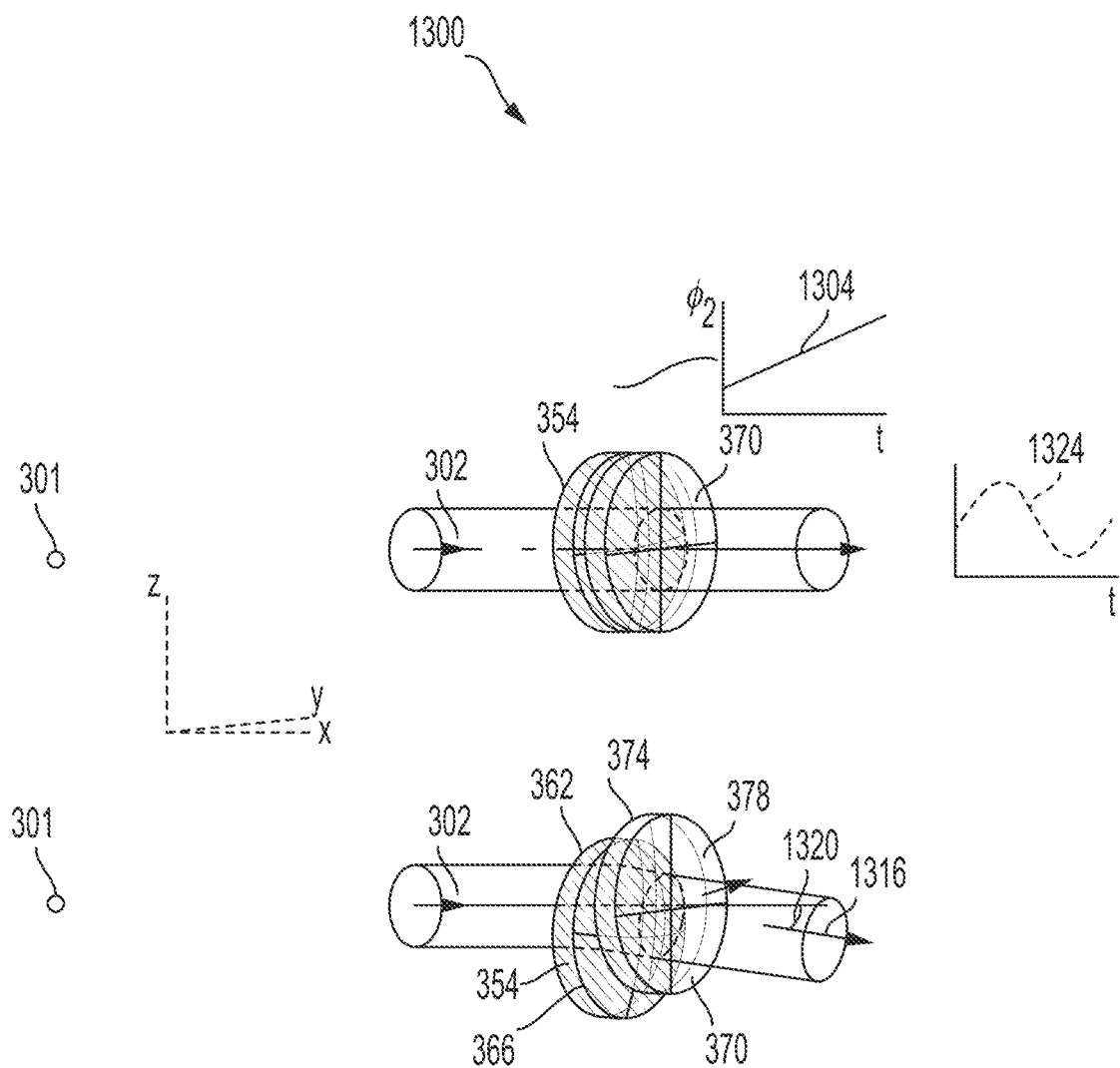
FIG. 13 is a schematic diagram of an example of articulation of multiple spherical lenses of a LIDAR system.

FIG. 13 depicts an example of an articulation 1300 that can be performed using the lenses 354, 370, such as to enable beam steering in both azimuth and elevation planes. For example, the first lens 354 can be a dynamic plano convex lens (e.g., articulated in a plane in which the optical axis 358 lies) and the second lens 370 can be a resonantly actuated plano concave lens. The first lens 354 can be articulated in various manners, including but not limited to a linear, monotonic profile 1304. For example, the first lens 354 can be coupled with a gimbal (not shown) centered about a curvature of the second portion 366 of the first lens 350 (e.g., aligned with the optical axis 358).

The beam 352 can be received at the first portion 362 and deflected by the second portion 366 to be outputted as a beam (not shown) at an angle with respect to the optical axis 358. With respect to the x-y-z frame of reference depicted for FIG. 13, the beam can be outputted from the second portion 366 in the x-y plane at an angle relative to the optical axis 358. The beam can be received at the third portion 374 and deflected to be outputted by the fourth portion 378 as a beam 1316 at an angle 1320 relative to the optical axis 358. As depicted for the articulation 1300, the second lens 370 can be articulate in the x-y plane that is orthogonal to the x-z plane for which articulation of the first lens 304 occurs; the articulation of the second lens 370 can occur in various planes in which the optical axis 358 lies, including but not limited to the x-z plane. The articulation of the second lens 370 can be performed using resonant motion (e.g., according to profile 1324), which can mitigate power usage relative to amplitude of the motion. The articulation of the second lens 370 can be substantially linear, in a manner analogous to that described for angle profile 608 described with reference to FIG. 6.

Figure 14:
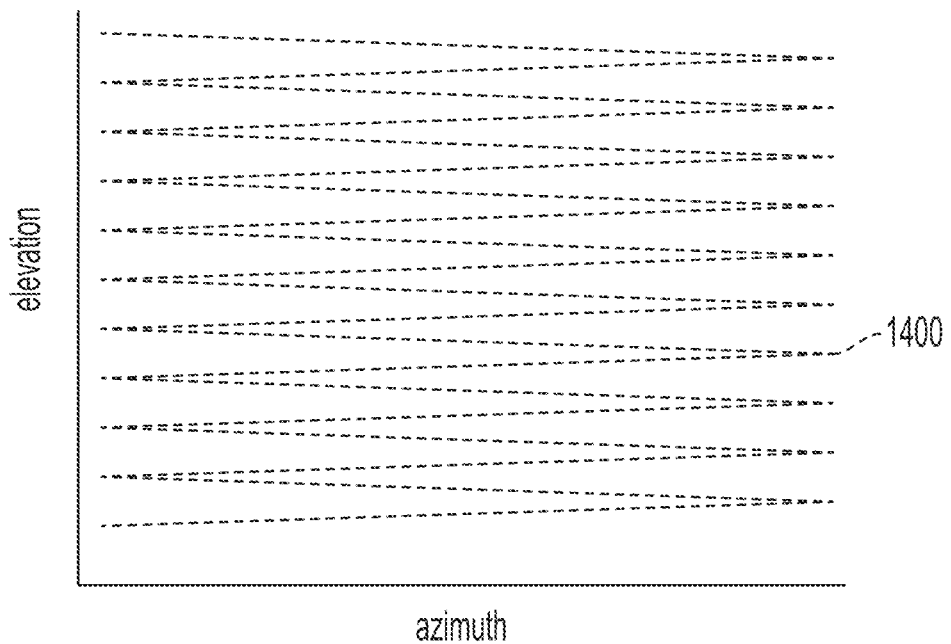
FIG. 14 is a chart of an example of a scan pattern performed using a LIDAR system including optics having multiple spherical lenses.

FIG. 14 depicts an example of a scan pattern 1400 resulting from the articulation 1300 described with reference to FIG. 13. As depicted in FIG. 14, the lenses 1354, 1370 can be oriented and articulated in orthogonal planes with respect to one another to achieve scanning in both elevation and azimuth.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

What is claimed is:

1. A light detection and ranging (LIDAR) system, comprising:
   a laser source configured to output a first beam along an optical axis;
   a first lens comprising a planar portion and a convex portion, the first lens configured to receive the first beam and output a second beam responsive to the first beam;
   a second lens comprising a concave portion and a planar portion, the second lens configured to receive the second beam and output a third beam responsive to the second beam; and
   an actuator configured to rotate at least one of the first lens or the second lens relative to the optical axis about a rotation axis offset from the at least one of the first lens or the second lens.

2. The LIDAR system of claim 1, wherein the actuator is configured to rotate at least one of the first lens or the second lens relative to the optical axis to adjust an angle of the third beam relative to the first beam.

3. The LIDAR system of claim 2, further comprising at least one of a spring or an actuated flexure coupled with the at least one of the first lens or the second lens to provide a linear restorative force to rotation of the at least one of the first lens or the second lens.

4. The LIDAR system of claim 2, wherein the actuator comprises at least one of a direct current (DC) motor or a voice coil.

5. The LIDAR system of claim 1, wherein an angle of the third beam over time is within eighty percent of being linear over an angle range between negative forty five degrees and positive forty five degrees.

6. The LIDAR system of claim 1, an angle of the third beam over time has a mean squared error relative to a triangular waveform less than about one percent.

7. The LIDAR system of claim 1, wherein the convex portion of the first lens faces the concave portion of the second lens to deflect the first beam from the planar portion as the second beam towards the concave portion.

8. The LIDAR system of claim 1, wherein the first lens and the second lens define a spacing between the first lens and the second lens such that a first optical power of the first lens is within a threshold of being equal to a second power of the second lens.

9. The LIDAR system of claim 1, further comprising a modulator configured to modulate at least one of a phase or a frequency of the first beam and transmit the modulated first beam to the first lens.

10. The LIDAR system of claim 1, further comprising:
    a position sensor configured to detect a position of at least one of the first lens or the second lens;
    wherein the actuator is configured to control rotation of the at least one of the first lens or the second lens responsive to the position.

11. The LIDAR system of claim 10, wherein the actuator is configured to rotate one of the first lens or the second lens, and the planar portion of the other of the first lens or the second lens is orthogonal to the optical axis along which the first beam is received from the laser source during rotation of the one of the first lens or the second lens.

12. The LIDAR system of claim 1, wherein the convex portion of the first lens is cylindrical or spherical to enable control of an angle of the second beam along at least one degree of freedom corresponding to a direction of curvature of the convex portion.

* * * * *